(12) United States Patent
Fu et al.

(10) Patent No.: US 8,936,212 B1
(45) Date of Patent: Jan. 20, 2015

(54) SYSTEM AND METHOD FOR COMPACT AND COMBINABLE AERIAL VEHICLE CAPABLE OF VERTICAL/SHORT TAKEOFF AND LANDING

(76) Inventors: Qiang Fu, San Jose, CA (US); Xu Zhang, San Jose, CA (US)

( * ) Notice: Subject to any disclaimer, the term of this patent is extended or adjusted under 35 U.S.C. 154(b) by 554 days.

(21) Appl. No.: 12/861,986

(22) Filed: Aug. 24, 2010

Related U.S. Application Data

(60) Provisional application No. 61/236,831, filed on Aug. 25, 2009.

(51) Int. Cl.
*B64C 15/12* (2006.01)

(52) U.S. Cl.
USPC .............................. 244/6; 244/7 R; 244/12.4

(58) Field of Classification Search
CPC    B64C 29/0033; B64C 29/0075; B64C 29/00; B64C 27/52; B64C 27/22; B64C 27/28
USPC ........... 244/6, 7 R, 12.4, 17.23, 17.25, 17.27, 244/23 B, 3
See application file for complete search history.

(56) References Cited

U.S. PATENT DOCUMENTS

| | | | | |
|---|---|---|---|---|
| 2,825,514 | A * | 3/1958 | Focke | 244/7 R |
| 3,149,800 | A * | 9/1964 | Sintes et al. | 244/7 R |
| 3,159,361 | A * | 12/1964 | Weiland | 244/12.1 |
| 3,249,322 | A * | 5/1966 | Holland, Jr. | 244/3 |
| 3,666,209 | A * | 5/1972 | Taylor | 244/7 C |
| 5,145,129 | A * | 9/1992 | Gebhard | 244/12.5 |
| 5,758,844 | A * | 6/1998 | Cummings | 244/7 C |
| 6,343,768 | B1 * | 2/2002 | Muldoon | 244/7 R |
| 6,467,726 | B1 * | 10/2002 | Hosoda | 244/60 |
| 7,159,817 | B2 * | 1/2007 | VanderMey et al. | 244/12.1 |
| 2006/0151666 | A1 * | 7/2006 | VanderMey et al. | 244/12.3 |
| 2007/0215746 | A1 * | 9/2007 | Rieken et al. | 244/6 |

\* cited by examiner

*Primary Examiner* — Philip J Bonzell

(57) ABSTRACT

System and method to construct vertical and/or short takeoff and landing (V/STOL) aerial vehicles capable of being folded into compact size, and capable of be combined with one or more such vehicles to form bigger composite aerial vehicles. Airframe of the vehicle comprises a plurality of wings on lateral or periphery of thrust generators, wherein arrangements of wings make it possible to optionally fold wings without moving thrust generators. Folding transforms such vehicles into ground vehicles which can share roads and house parking lots with conventional ground vehicles. Therefore such vehicles can be used as V/STOL flying cars. Means are provided for attaching to and detaching from one or more similarly equipped vehicles in flight or before takeoff, so that multiple vehicles can form a large composite vehicle. Compactness, combinability and V/STOL capability enable versatile applications.

10 Claims, 26 Drawing Sheets

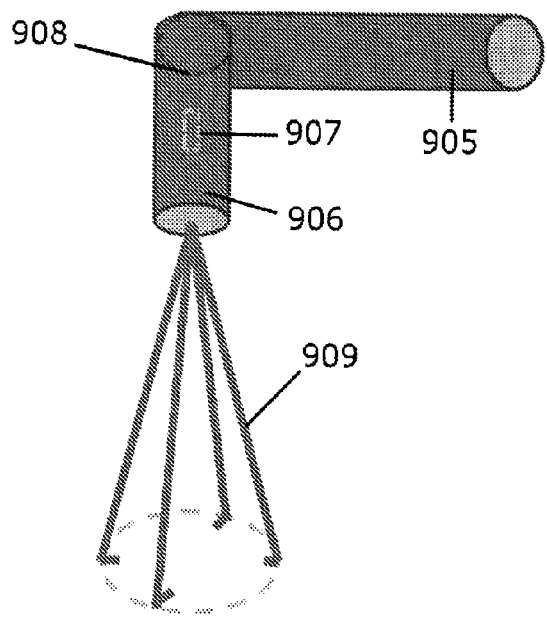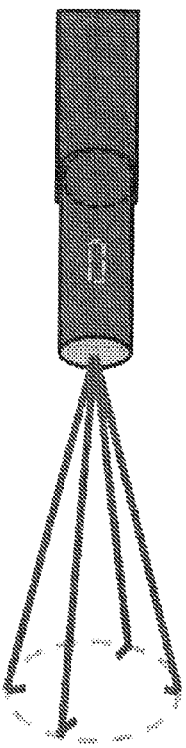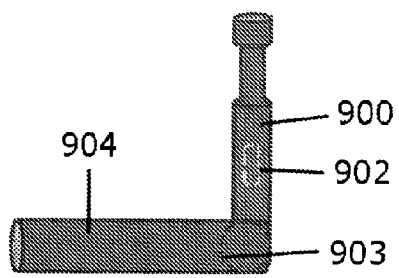
FIG. 6A
FIG. 6B
FIG. 6C

SYSTEM AND METHOD FOR COMPACT AND COMBINABLE AERIAL VEHICLE CAPABLE OF VERTICAL/SHORT TAKEOFF AND LANDING

CROSS-REFERENCE TO RELATED APPLICATIONS

None.

FEDERALLY SPONSORED RESEARCH

None.

SEQUENCE LISTING

None.

TECHNICAL FIELD

This invention generally relates to manned aerial vehicle and unmanned aerial vehicle (UAV), and specifically provides system and method to construct vertical and/or short takeoff and landing (V/STOL) aerial vehicles capable of being folded into compact size, and capable of be combined with one or more such vehicles to form bigger composite aerial vehicles.

BACKGROUND

Previously, some exemplary V/STOL aircrafts are: CH-47 Chinook helicopter (FIG. 1) with counter-rotating twin-rotor, V-22 Osprey (FIG. 2) with wing-tip mounted counter-rotating twin-rotor and AV-8B Harrier II featuring a single turbofan engine with two intakes and four thrust-vectoring nozzles. Helicopter in general has a long history and is improved overtime, and now it's near its limits. One disadvantage of helicopter is that its horizontal speed is limited comparing to conventional fixed wing aircraft. The wing spans of V-22 Osprey type of V/STOL aircrafts are usually limited due to the fact that as the wing span becomes longer, it becomes harder to maintain enough mechanic structure strength to support wing tip mounted heavy rotors without adding a lot of weight penalty. Limited wing span limits lift generated by the wing in horizontal flight, and results in lower efficiency in horizontal flight. AV-8B Harrier II type of V/STOL aircrafts uses jet engine. One of objectives of the present invention is to be able to use wide range of power plants including electric engine, internal combustion engine and jet engine.

Wings are usually main parts of an airframe. A pair of swept wings generally results in V-shape. There are 2 types of swept wings: swept-back wing and forward-swept wing. Swept wings, especially swept-back wings, are widely used in modern aircrafts with high horizontal flight speed. Swept and un-swept wings generally provide lift, store fuel and hold aerodynamic controls such as flap, aileron and elevator. A special type of wing, Chaplin V-Wing (FIG. 3A to 3E) with boundary-layer-controlled thick-suction airfoil can also hold cargo and passengers. Chaplin V-Wing aircraft is envisioned for horizontal takeoff and landing. Its engines are mounted right after head of the V-shape. While all the above mentioned functions of wings can still applied to the wings used in the present invention, the present invention primarily utilizes the space enclosed by swept wings to dispose thrust-generating devices such as propellers, ducted fan and jet nozzles. Beside V-shape, the present invention also utilizes other shapes such as X-shape. When multiple vehicles are combined or connected together to form a larger composite aircraft, the number of resulted shapes is almost endless.

BRIEF SUMMARY

In accordance with the exemplary embodiments thereof described herein, the present invention provides a system and method to construct compact and combinable V/STOL aerial vehicle with thrust-generating devices disposed in space enclosed by swept wings. The vehicle utilizes one or more power plants. When more than one power plants are utilized, they can be of the same type, and can also be of different types (i.e., hybrid engines), and furthermore they can have different output power capacities. Thrust vectors can change directions of the vectors in 2 dimensions (2D) or 3 dimensions (3D). The coupling of a power plant with one or more thrust-generating devices can be indirectly via transmission devices or directly.

In accordance with the exemplary embodiments, the wings of a vehicle can be folded, and therefore the vehicle can have compact size so that it can be parked at parking lot in front of an ordinary house, and can be driven independently, or towed by or carried on a ground vehicle on highway while satisfying legal dimensional limits. In military application, such a UAV can be carried on roof of personnel carrier ground vehicle or towed by a ground vehicle to travel together with Army soldiers for providing instant air support, surveying or ground attack. In civilian application, such a manned vehicle becomes a flying car with driver as its pilot and one or more passengers. It's capable of taking off and landing vertically in parking lot.

In accordance with the exemplary embodiments, for special applications, multiple vehicles can be combined together to form a larger composite aircraft. They can be assembled on the ground and then take off together, or they can take off individually, rendezvous and connect to each other in the air.

The following detailed description and accompanying drawings are provided for purposes of illustrating and describing presently preferred embodiments of the invention and are not intended to limit the scope of the invention in any way. It will be recognized that further embodiments of the invention may be used.

While the description above refers to particular embodiments of the present invention, it will be understood that many modifications may be made without departing from the spirit thereof. The presently disclosed embodiments are therefore to be considered in all respects as illustrative and not restrictive.

BRIEF DESCRIPTION OF THE DRAWINGS

FIG. 6A illustrates approaching phase of in-flight rendezvous and docking system in lateral mode.

FIG. 6B illustrates approaching phase of in-flight rendezvous and docking system in longitudinal mode.

FIG. 6C illustrates lined up phase of in-flight rendezvous and docking system in lateral mode.

DETAILED DESCRIPTION

Figure 7A:
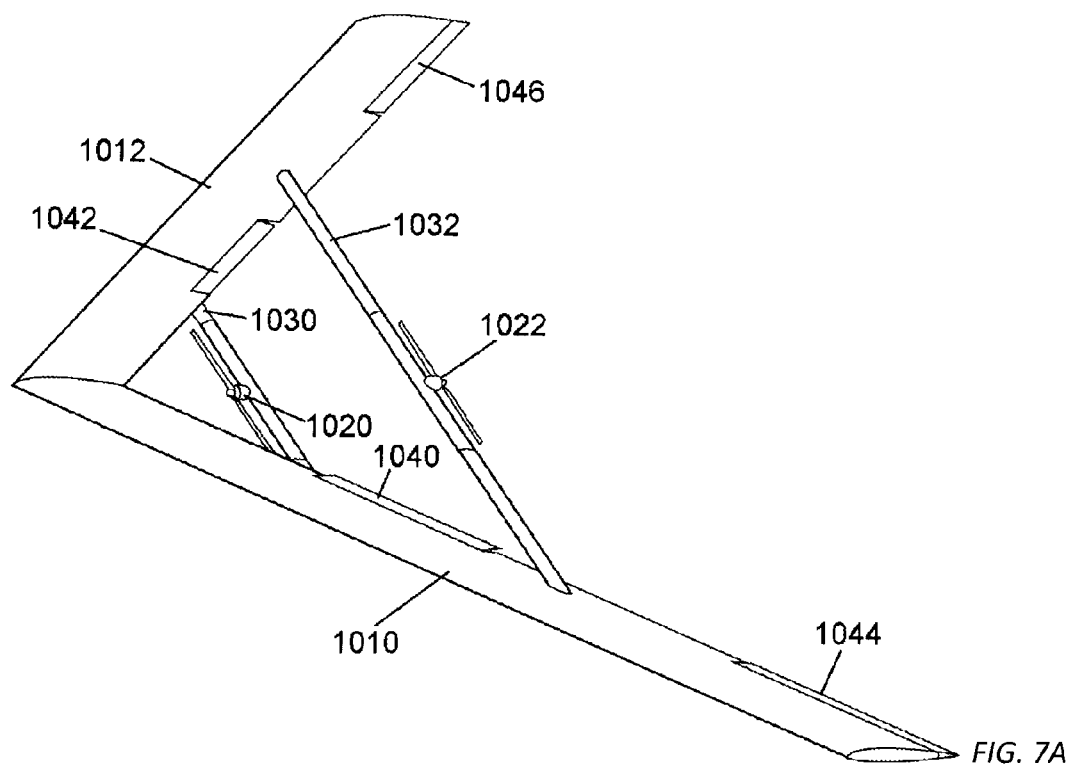
FIGS. 7A and 7B are upper left front perspective view of the 1$^{st}$ embodiment in horizontal flight configuration and VTOL configuration respectively.
Figure 7B:
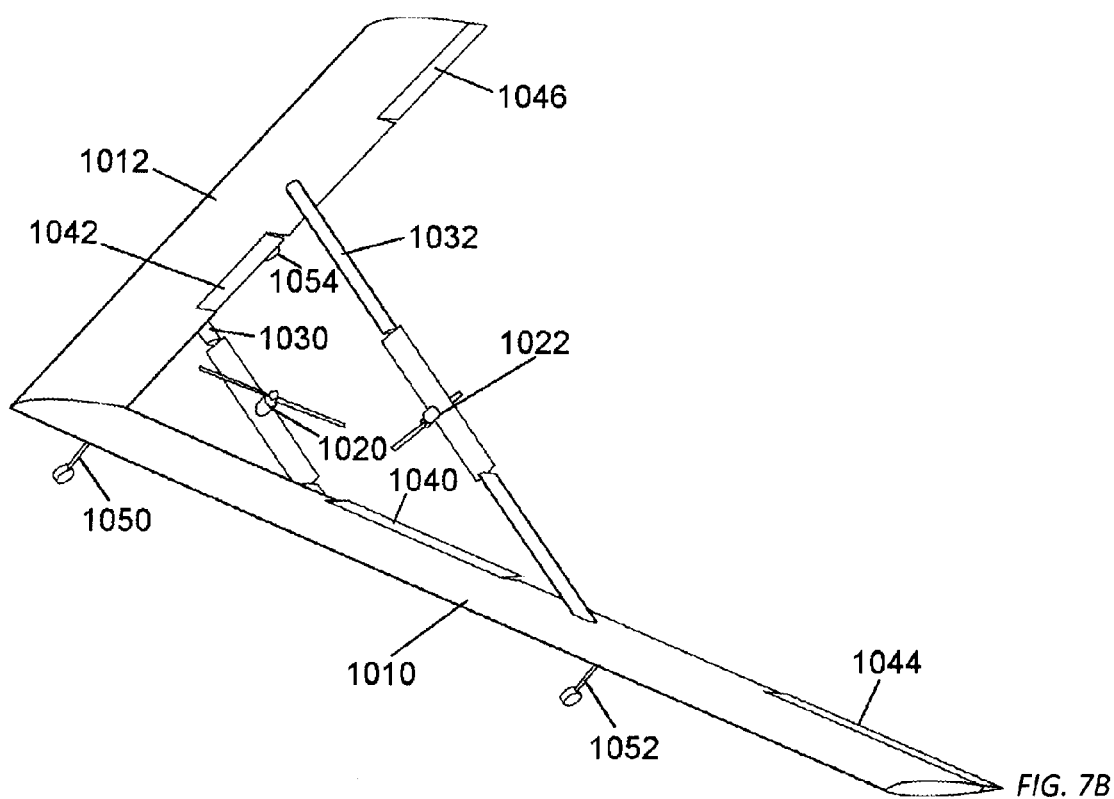
Figure 7C:
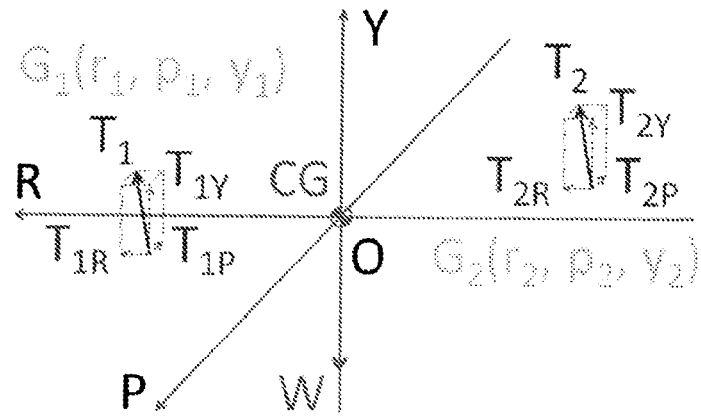
FIG. 7C is a weight and thrust vector diagram with 3D thrust vectoring and 2 thrust generators.

FIGS. 7A to 7C—First Embodiment

The first embodiment is illustrated in FIG. 7A (perspective view of horizontal flight configuration) and FIG. 7B (perspective view of VTOL configuration with landing gears extended). Left wing 1010 and right wing 1012 are joined at head position to form a general V shape. Front thrust generator 1020 and rear thrust generator 1022 are supported by front beam 1030 and rear beam 1032. Although thrust generators in FIG. 7A are shown in form of propeller driven by an engine, other forms of thrust generators such as jet, turbofan can also be used. In such pictures, thrust generators have to be shown in a form, and here the propeller form is chosen, so it should not be interpreted that only propeller form can be used.

Optionally, there are pivotable control surface 1040 and 1044 at trailing edge of left wing 1010, and symmetrically with respect to rolling axis, 1042 and 1046 are located at trailing edge of right wing 1012. Control surface 1040 and 1042 function as traditional flaps for increased lift, and they can also function as part of ailerons. A control surface that combines an aileron and flap is called a flaperon. Control surface 1044 and 1046 are located behind center of gravity (CG), and function as both traditional ailerons to control rolling rotation about longitudinal axis or rolling axis, and traditional elevators to control pitching rotation about lateral axis or pitching axis.

When pivotable control surface 1040/1042 or 1044/1046 are not implemented, corresponding functions can be performed by thrust generator via equations (10) through (8) below. With pivotable control surface 1040/1042 and 1044/1046 are implemented, control handling is enhanced and more flexible.

Front landing gear 1050 locates under head section where right and left wing are joined together. Left landing gear 1052 and right landing gear are located under rear half segments of left and right wing respectively. In a vertical plane parallel to longitudinal axis, these 3 landing gears rotate back and forth to extending and retracting position respectively.

OPERATION

FIGS. 7A to 7C—First Embodiment

In horizontal takeoff, landing and flight mode, configuration of the first embodiment is shown in FIG. 7A. Thrust generators 1020 and 1022 are generally facing forward. In these modes, the first embodiment operates in the same way as a conventional airplane.

In vertical takeoff mode, configuration of the first embodiment is shown in FIG. 7B. Thrust generators 1020 and 1022 are generally facing upward. In General, during vertical takeoff, throttles of thrust generators are increased and independently controlled, and directions of thrust are also independently controlled so that total generated thrust is greater than weight of the vehicle in order to lift up the vehicle, and total moment with regarding its CG is zero or always approaching zero when it's disturbed in order to eliminate or minimize rotations. When the vehicle starts to move up, it's no longer necessary to increase throttles. In details, control of translation movement along and rotation movement about longitudinal, lateral and perpendicular axis are described below.

FIG. 7C is a weight and thrust vector diagram of the first embodiment and it also applies to thrust configuration of all embodiments configured with 2 thrust generators in this inventions. CG is chosen as the point of origin O of the coordinate system. In FIG. 7C, thrust vector $T_1$ generated by thrust generator 1020 and $T_2$ generated by thrust generator 1022 are shown to be decomposed into 3 orthogonal components ($T_{1R}$, $T_{1P}$, $T_{1Y}$) and ($T_{2R}$, $T_{2P}$, $T_{2Y}$) respectively. Throttles of thrust generator 1020 and 1022 control magnitude of thrust vector $T_1$ and $T_2$ respectively. The orientation angle of thrust generator 1020 and 1022 controls how thrust vector $T_1$ and $T_2$ are decomposed into 3 orthogonal components ($T_{1R}$, $T_{1P}$, $T_{1Y}$) and ($T_{2R}$, $T_{2P}$, $T_{2Y}$) respectively.

During vertical takeoff, translational motion along yawing axis (OY axis shown in FIG. 7C) is controlled by thrust vector component $T_{1Y}$ and $T_{2Y}$. When sum of $T_{1Y}$ and $T_{2Y}$ is greater than vehicle weight W, the vehicle will accelerate in OY axis direction, and therefore will be lifted up. When there is sufficient upward velocity, sum of $T_{1Y}$ and $T_{2Y}$ can also be adjusted to be equal to W.

During vertical takeoff, translational motion along rolling axis (OR axis shown in FIG. 7C) is controlled by thrust vector component $T_{1R}$ and $T_{2R}$. To achieve zero translational motion along rolling axis, change $T_{1R}$ or $T_{2R}$ or both in opposite direction of the motion.

Figure 1:
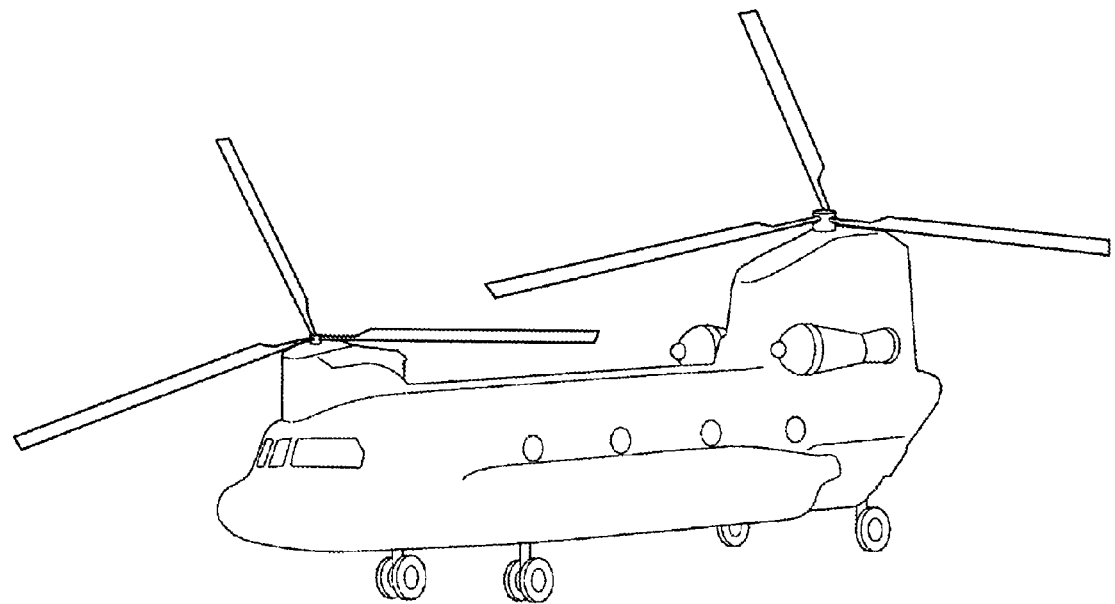
FIG. 1 is an upper left front perspective view of CH-47 Chinook helicopter with counter-rotating twin-rotor.
Figure 2:
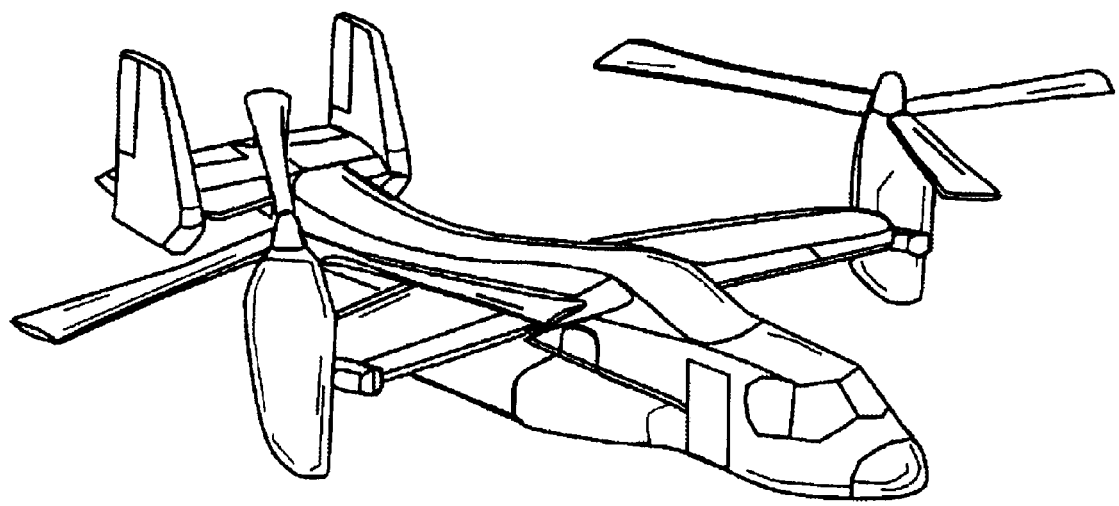
FIG. 2 is an upper right front perspective view of V-22 Osprey with wing-tip mounted counter-rotating twin-rotor.
Figure 3A:
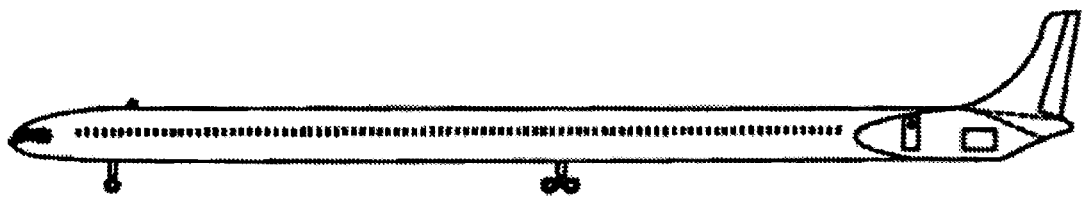
FIG. 3A is a side view of Chaplin V-Wing.
Figure 3B:
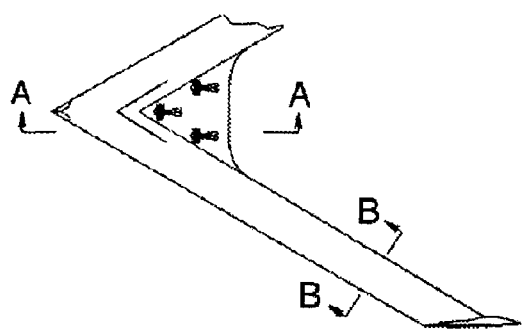
FIG. 3B is a plan view of Chaplin V-Wing.
Figure 3C:
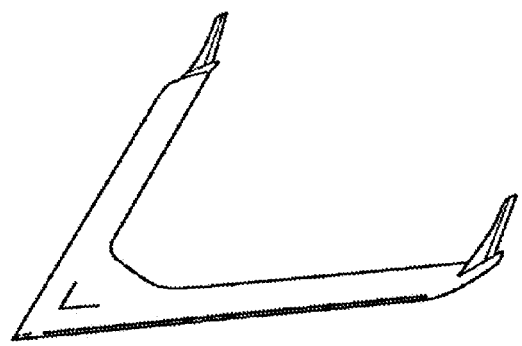
FIG. 3C is an upper left front perspective view of Chaplin V-Wing.
Figure 3D:
FIG. 3D is a steam-wise cross section view of A-A cross section in FIG. 3B.
Figure 3E:
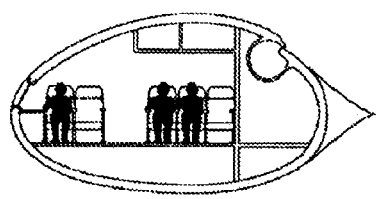
FIG. 3E is a cross section view of B-B cross section in FIG. 3B.

Similarly during vertical takeoff, translational motion along pitching axis (OP axis shown in FIG. 2C) is controlled by thrust vector component $T_{1P}$ and $T_{2P}$. To achieve zero translational motion along pitching axis, change $T_{1P}$ or $T_{2P}$ or both in opposite direction of the motion.

During vertical takeoff, rotational motions around rolling axis OR, pitching axis OP and yawing axis OY are controlled by net moment of thrust vectors. Moment vector $M_k$ of thrust vector $T_k$ is cross product of vector $OG_k$ and thrust vector $T_k$, i.e., $$M_k = OG_k \times T_k \tag{1}$$

where k=1 and 2 in the case of 2 thrust generators (or k=1, 2 and 3 in the case of 3 thrust generators); $G_k$ is the position of thrust generator with coordinates ($r_k$, $p_k$, $y_k$), and vector $OG_k$ is the vector from origin O to pint $G_k$.

Components of moment vector $M_k$ in rolling, pitching and yawing axis are denoted as rolling moment $M_{kR}$, pitching moment $M_{kP}$ and yawing moment $M_{kY}$ respectively, and from the above vector cross product equation (1), we have:

$$M_{kR} = p_k T_{kY} - y_k T_{kP} \tag{2}$$

$$M_{kP} = y_k T_{kR} - r_k T_{kY} \tag{3}$$

$$M_{kY} = r_k T_{kP} - p_k T_{kR} \tag{4}$$

where k=1 and 2.

Net moment vector M is sum of all moment vector $M_k$, i.e., $$M = \Sigma M_k \tag{5}$$

Corresponding net rolling moment $M_R$, net pitching moment $M_P$ and net yawing moment $M_Y$ are:

$$M_R = \Sigma(p_k T_{kY} - y_k T_{kP}) \tag{6}$$

$$M_P = \Sigma(y_k T_{kR} - r_k T_{kY}) \tag{7}$$

$$M_Y = \Sigma(r_k T_{kP} - p_k T_{kR}) \tag{8}$$

where k=1 and 2 (or k=1, 2 and 3 in the case of 3 thrust generators).

During vertical takeoff, when there are rotational motions due to disturbance, net moment component $M_R$, $M_P$ and $M_Y$ can be adjusted by changing $T_{kR}$, $T_{kP}$ and $T_{kY}$ (where k=1 and 2) according to the above formulae so that the net moment vector M causes the vehicle to return its original state with zero rolling, pitching and yawing angle.

In vertical landing mode, the vehicle operates in the same way as in vertical takeoff mode, except sum of $T_{1Y}$ and $T_{2Y}$ is adjusted to be less than vehicle weight W when there is no downward movement, or to be equal to W when there is sufficient downward velocity.

In hover mode, the vehicle operates in the same way as in vertical takeoff and landing mode, except 1) when there is upward speed, goes to vertical landing mode; 2) when there is downward speed, goes to vertical takeoff mode; and 3) when there is no vertical speed, adjust sum of thrust component $T_{1Y}$ and $T_{2Y}$ to be equal to vehicle weight W.

When transiting from vertical takeoff mode to horizontal flight mode, thrust vector $T_1$ and $T_2$ are gradually rotated toward its horizontal flight position, which is approximately parallel to OR axis. The vehicle will gradually build up forward speed, and wings will start to generate lift. When the forward speed is fast enough so that lift generated by wings is no less than vehicle weight W, the transition is completed.

When transiting from horizontal flight mode to hover or vertical landing mode, thrust vector $T_1$ and $T_2$ are gradually rotated to pass direction of OY axis so that there are thrust components in the opposite direction of horizontal movement in order to reduce horizontal movement speed towards zero. When horizontal movement speed comes down to zero, the transition is completed. When zero horizontal is not strictly required, it's good to have some horizontal speed during descending.

DETAILED DESCRIPTION

Figure 8A:
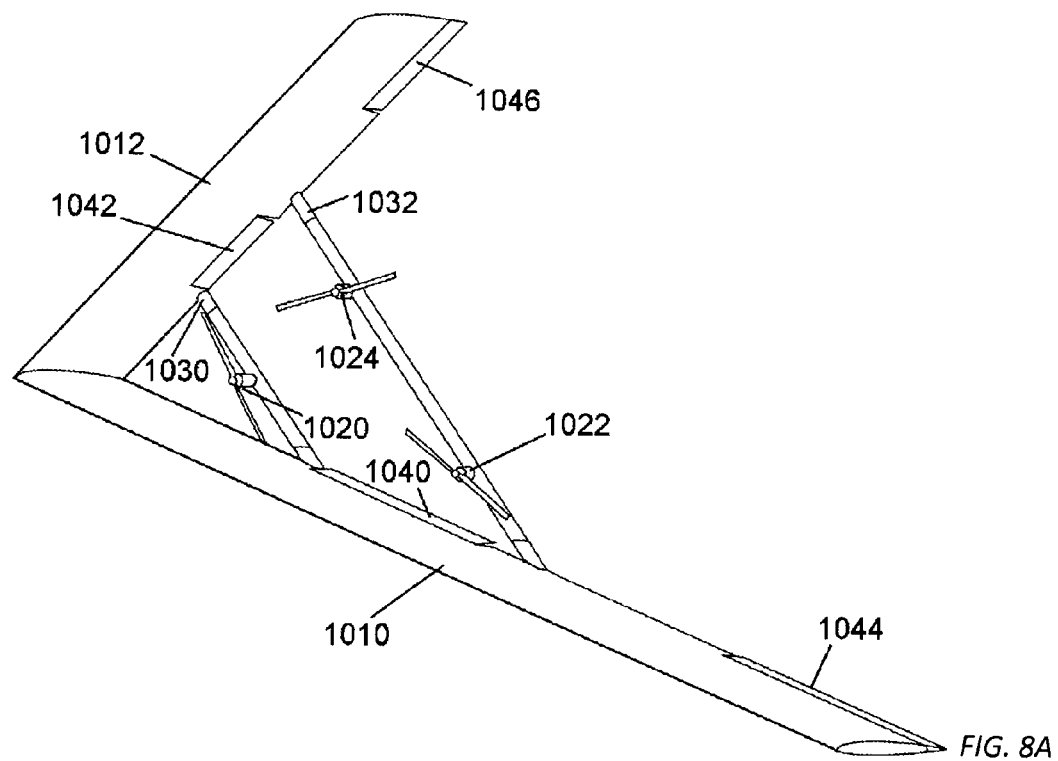
FIGS. 8A and 8B are upper left front perspective view of an alternative of the 1$^{St}$ embodiment in horizontal flight configuration and VTOL configuration respectively.
Figure 8B:
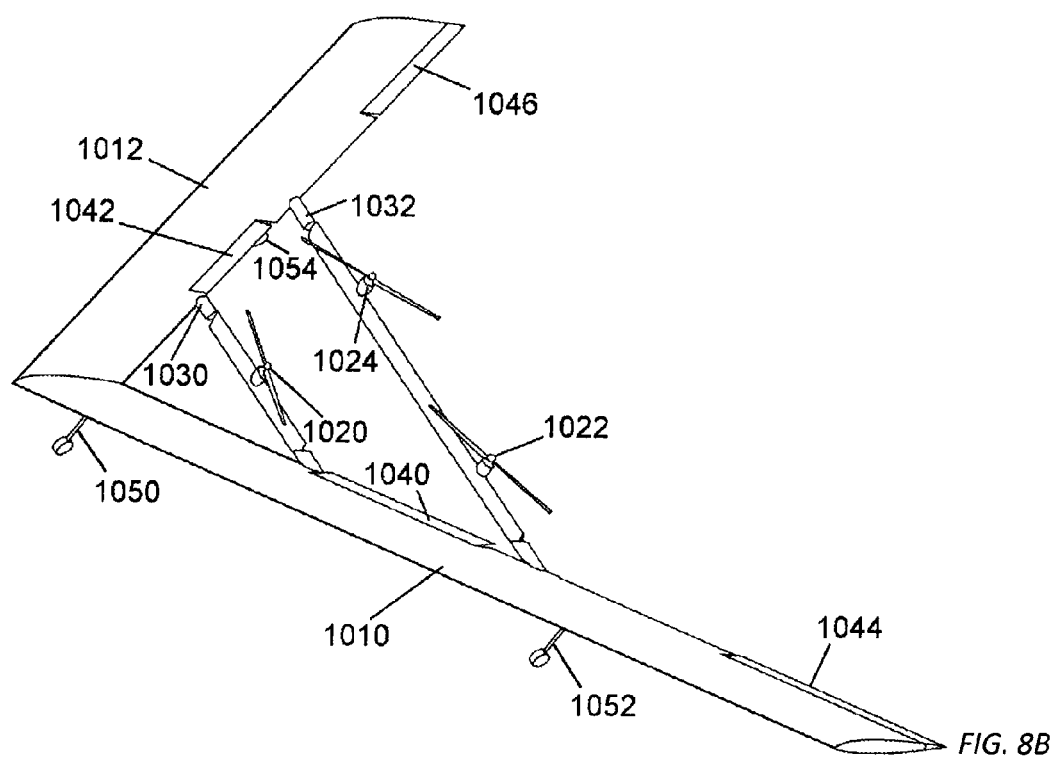

FIGS. 8A to 8B—Alternative of First Embodiment

Figure 7D:
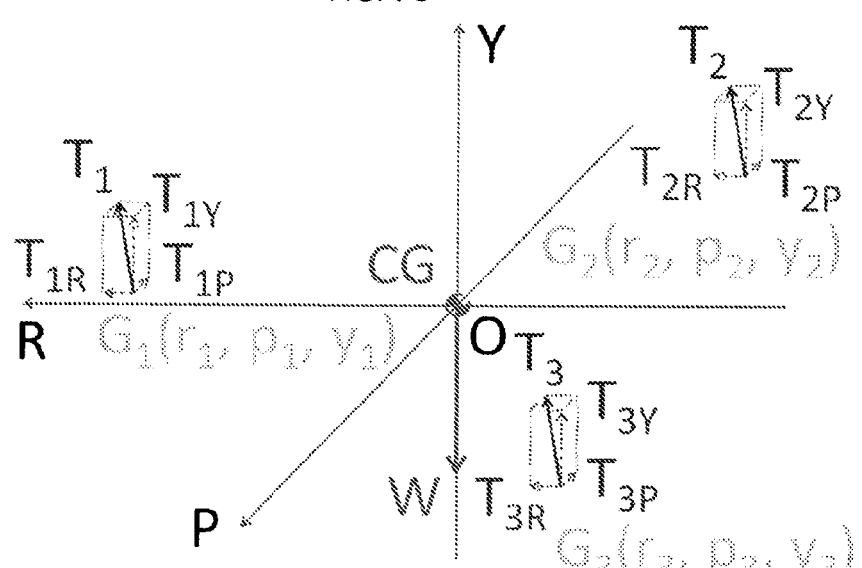
FIG. 7D is a weight and thrust vector diagram with 3D thrust vectoring and 3 thrust generators.
Figure 7E:
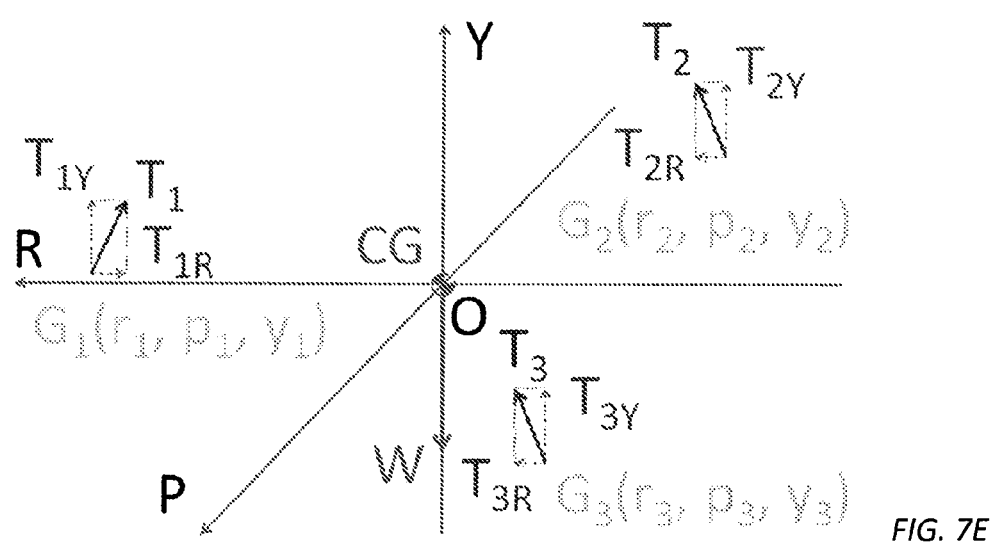
FIG. 7E is a weight and thrust vector diagram with 2D thrust vectoring and 3 thrust generators.

An alternative embodiment of the first embodiment is illustrated in FIG. 8A (perspective view of normal horizontal flight configuration) and FIG. 8B (perspective view of VTOL configuration with landing gears extended). The structure of the alternative embodiment is the same as that of the first embodiment, except there are 3 thrust generators. Front thrust generator 1020 is disposed at the middle of front beam 1030. Rear thrust generator 1022 is disposed on rear beam 1032 on left side of rolling axis (OR axis in FIG. 7D) passing through CG of the embodiment. Rear thrust generator 1024 is disposed on rear beam 1032 on right side of rolling axis. As shown in FIGS. 7D and 7E, $G_1$, $G_2$ and $G_3$ are centers of thrust generator 1020, 1024 and 1022 respectively, and their coordinates are ($r_1$, $p_1$, $y_1$), ($r_2$, $p_2$, $y_2$) and ($r_3$, $p_3$, $y_3$) respectively. Plane passing through $G_1$, $G_2$ and $G_3$ is generally parallel to rolling axis OR and pitching axis OP.

Preferred CG position is a position which satisfies the following 2 conditions:

1. $G_1$, $G_2$ and $G_3$ are on the plane passing through rolling axis OR and pitching axis OP.

This condition can also be expressed as: $y_k = 0$ (where K=1, 2, and 3).

2. G1 is on rolling axis OR. This condition can also be expressed as: $p_1 = 0$.

In real operations, CG position will often change due to various reasons such as dropping payload, consuming fuel, etc.

OPERATION

FIGS. 8A to 8B—Alternative of First Embodiment

The operation of the alternative embodiment of the first embodiment is the same as that of the first embodiment except vertical takeoff and landing is possible with only 2D thrust vectoring.

When 3D thrust vectoring is used as shown in FIG. 7D, formulae to calculate net rolling moment $M_R$, net pitching moment $M_P$ and net yawing moment $M_Y$ are the same as equation (6), (7) and (8) except the subscript K=1, 2, and 3.

When 2D thrust vectoring is applied as shown in FIG. 7E, there is no side thrust vectoring, so side thrust component $T_{kP}=0$ (where K=1, 2, and 3), and therefore for 2D thrust vectoring, equation (6), (7) and (8) are reduced into the following form:

$$M_R = \Sigma(p_k T_{kY}) \quad (9)$$

$$M_P = \Sigma(y_k T_{kR} - r_k T_{kY}) \quad (10)$$

$$M_Y = \Sigma(-p_k T_{kR}) \quad (11)$$

where k=1, 2 and 3.

For the case where CG is at the preferred position, we have $p_i=0$ and $y_k=0$ (where K=1, 2, and 3), and therefore equation (9), (10) and (11) are further simplified to:

$$M_R = p_2 T_{2Y} + p_3 T_{3Y} \quad (12)$$

$$M_P = -r_1 T_{1Y} - (r_2 T_{2Y} + r_3 T_{3Y}) \quad (13)$$

$$M_Y = -p_2 T_{2R} - p_3 T_{3R} \quad (14)$$

Thus for the case where CG is at the preferred position, rolling and yawing rotations are only controlled by 2 rear thrust generators. Also $M_Y$ is decoupled from $M_R$ and $M_P$. When $M_R$ needs be changed to roll the vehicle back to zero rolling angle (i.e., wings are leveled), although $T_{2Y}$ and $T_{3Y}$ need be changed, $T_{1Y}$ can be adjusted so that there is no change in pitching moment $M_P$. When $M_P$ need be changed to control pitching rotation, adjusting only $T_{1Y}$ would not affect rolling moment $M_R$. Therefore there are ways to adjusting anyone of moment component $M_Y$, $M_R$ and $M_P$ without affecting any other moment components.

Configuration of 3 thrust generators is preferred over that of 2 thrust generators for the following reasons:
1. 2D thrust vectoring is sufficient for VTOL in the configuration of 3 thrust generators.
2. 2D thrust vectoring is simpler than 3D thrust vectoring.
3. Due to less coupling, it's much easier to adjust throttles and vectoring angles to achieve desired rotational motion control.

DETAILED DESCRIPTION

Figure 5:
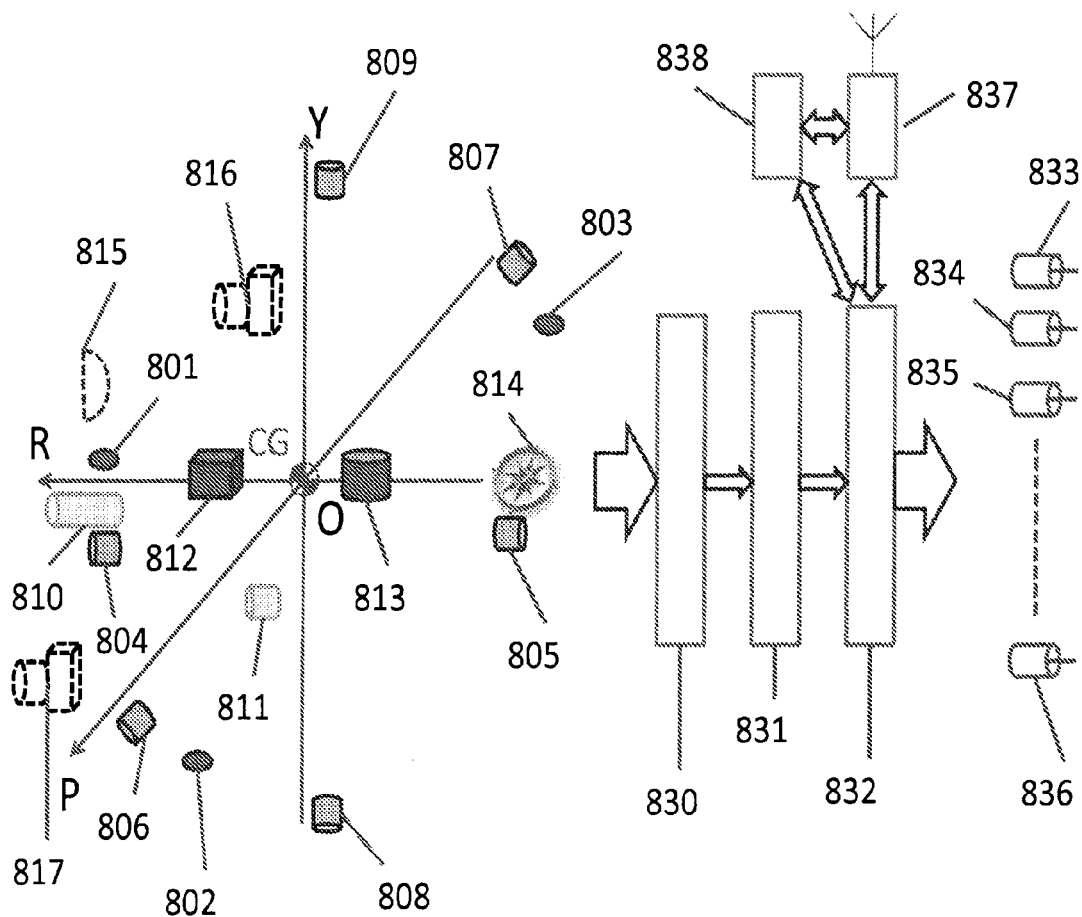
FIG. 5 is a diagram of major components of onboard avionics and flight control system.

FIG. 5—Avionics and Flight Control System of all Embodiments

Major components of avionics and flight control system of all embodiments in this invention are illustrated in FIG. 5. The coordinate system ORPY in FIG. 5 is the same as that in FIG. 7C to 7E.

Three GPS receiver 801, 802 and 803 form a differential GPS measuring sub-system, which can measure positions of 2 GPS receivers (e.g., 802 and 803) relative to a common base GPS receiver (e.g., 801) in high accuracy due to error cancellation in the differential mode. Attitude of an aircraft can be determined by 3 angles: rolling angle around OR axis, pitching angle around OP axis, and yawing angle around OY axis. With the relative positions measured, attitude of an aircraft can be calculated. For example, assume receiver 801, 802 and 803 form an equilateral triangle, and length of an edge is 100 cm. Height of the triangle is 100 cm*sin 60=86.6 cm. When a measurement indicates that both receiver 802 and 803 are 10 cm lower than base receiver 801 in Y direction, pitching angle of the aircraft can be calculated as $\sin^{-1}(10/86.6)=6.6$ degrees, i.e., the aircraft pitched up 6.6 degrees.

Translational motion parameters, such as position and velocity, can be read out from any of these 3 GPS receivers. Their accuracy is within normal GPS error range.

In order to continue to work in the case GPS signal is lost or is too noisy, the differential GPS measuring sub-system is augmented with traditional inertia sensors. 812 is a 3D accelerometer to measure 3D accelerations. Integral of acceleration over time yields velocity, and integral of velocity over time results in position. 813 is a 3D gyroscope sensor to measure 3D rotation speed. Integral of rotation speed over time yields rotation angle. 814 is 3D magnetic sensor which can be used to determine orientation by measure 3D components of Earth magnetic field.

The sensor system is further augmented by 3 pairs of infrared sensors. A commercial product claims to offer accuracy to 1 degree of the horizon by sensing the temperature variation between the earth and the sky. Pair of infrared sensor 804 and 805, pair of 806 and 807 and pair of 808 and 809 are disposed along rolling, pitching and yawing axis respectively. Each infrared sensor is facing outward. Under normal circumstance, infrared sensors can provide 2 of 3 attitude angels: rolling and pitching angle. Yawing angle can be provided by 3D magnetic sensor 814. Pair of 808 and 809 provides reference temperature of earth and sky respectively, and helps to determine if aircraft is upside down. Pair of 804 and 805 senses pitch angle. Pair of 806 and 807 senses roll or bank angle.

Differential air pressure sensor 810 measures air speed. Absolute air pressure sensor 811 measures altitude by sensing atmospheric pressure. 815 is an optional radar for collision avoidance. And 816 and 817 is an optional pair of image sensor for stereo vision.

All the above sensor data are fed in real time into data acquisition sub-system 830, which preprocessed the data, and then feed the preprocessed data to a faster core data processing sub-system 831. Core data processing sub-system 831 performs CPU intensive computation to calculate values of vital parameters, such as 6 degree of freedom (6DOF) parameters (3D position plus 3D attitude), velocity, acceleration, etc. in real time. These real time vital parameter values are passed to autopilot sub-system 832. With information of next waypoint, current 6DOF, velocity and acceleration, etc., autopilot sub-system determines next desired 6DOF, velocity and acceleration, etc., and issues commands to various actuators ($1^{st}$ actuator 8033, $2^{nd}$ actuator 8034, $3^{rd}$ actuator 8035, ..., last actuator 8036) to control various flight controls such as engine throttle, thrust vectoring, ailerons, flaps, elevators in order to reach desired flight state.

Autopilot sub-system 832 also communicates with communication system 837 and payload control system 838. Payload control system 838 also communicates with communication system 837. For example, video camera payload sends images to and receives commands from ground control station via communication system 837.

DETAILED DESCRIPTION

Figure 9A:
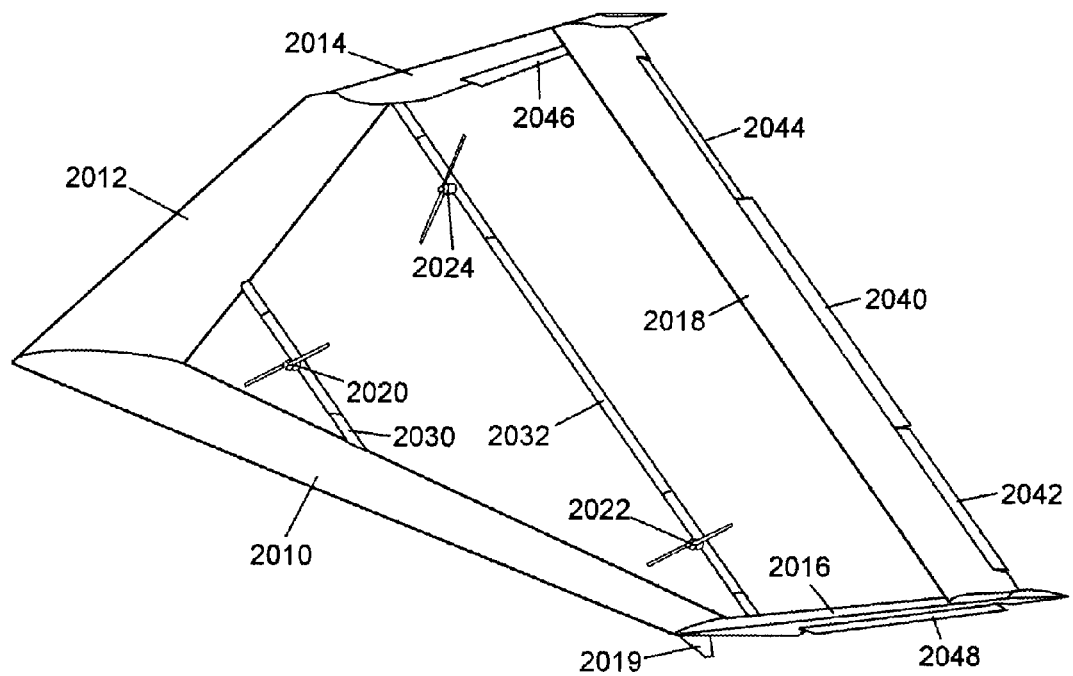
FIGS. 9A and 9B are upper left front perspective view of the 2$^{nd}$ embodiment in horizontal flight configuration and VTOL configuration respectively.
Figure 9B:
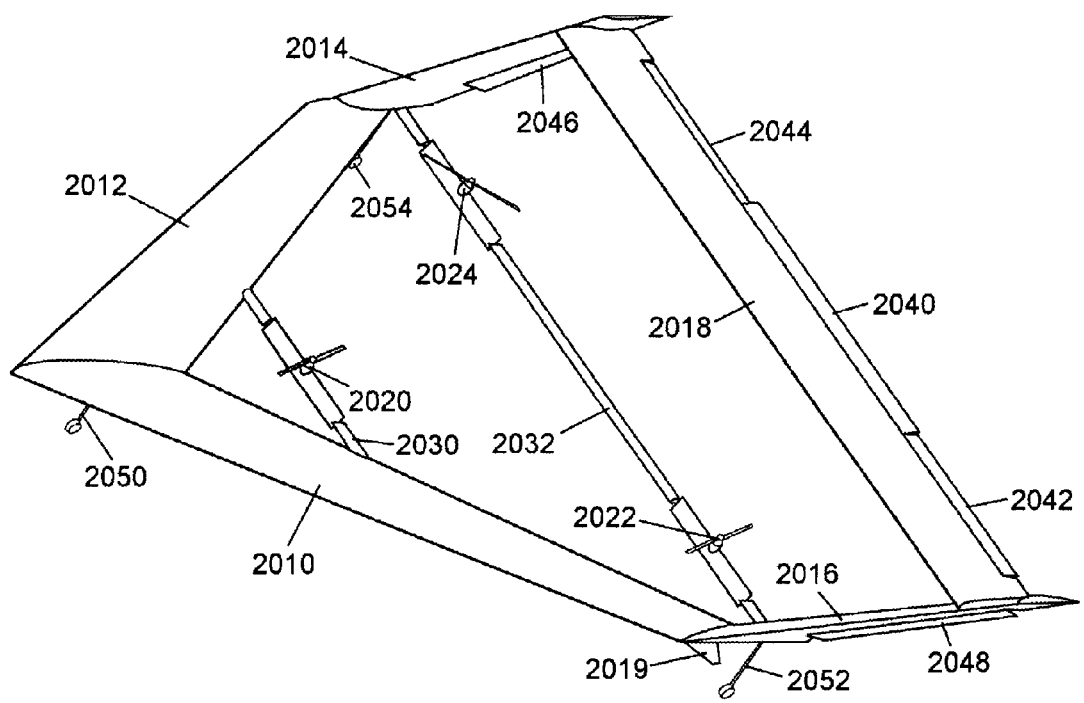

FIGS. 9A to 9B—Second Embodiment

The 2nd embodiment is illustrated in FIG. 9A (perspective view of normal horizontal flight configuration) and FIG. 9B (perspective view of VTOL configuration with landing gears extended). It's derived from the embodiment illustrated in FIGS. 8A and 8B. The structural changes are:
1. Rear beam 2032 is horizontally connected to the rear ends of left wing 2010 and right wing 2012.
2. Left vertical stabilizer 2014 and right vertical stabilizer 2016 are vertically connected to rear ends of left wing 2010 and right wing 2012 respectively, and also function as winglet of left wing 2010 and right wing 2012 respectively. Pivotable rudder 2046 and 2048 are disposed at trailing edges of left vertical stabilizer 2014 and right vertical stabilizer 2016 respectively.

3. Horizontal stabilizer 2018 is disposed between left vertical stabilizer 2014 and right vertical stabilizer 2016. It's connected to higher ends of the left and right vertical stabilizer. Pivotable elevator 2040 is disposed at middle section of trailing edge of horizontal stabilizer 2018. Pivotable left aileron 2042 and right aileron 2044 are disposed at left and right section of trailing edge of horizontal stabilizer 2018 respectively.
4. Left downward winglet 2019 and right downward winglet 2017 (obstructed in FIGS. 9A and 9B) are disposed below left vertical stabilizer 2014 and right vertical stabilizer 2016 respectively, and are connected to rear ends of left wing 2010 and right wing 2012 respectively.

OPERATION

FIGS. 9A to 9B—Second Embodiment

In horizontal takeoff, landing and flight mode, configuration of the 2nd embodiment is shown in FIG. 9A. Thrust generators 2020, 2022 and 2024 are generally facing forward. In these modes, the 2nd embodiment operates in the same way as a conventional airplane.

In all other modes, i.e. in vertical takeoff mode, vertical landing mode, hover mode, mode of transition from vertical takeoff to horizontal flight, and mode of transition from horizontal flight to vertical landing, the 2nd embodiment operates in the same way as the embodiment in FIGS. 8A and 8B.

DETAILED DESCRIPTION

Figure 10A:
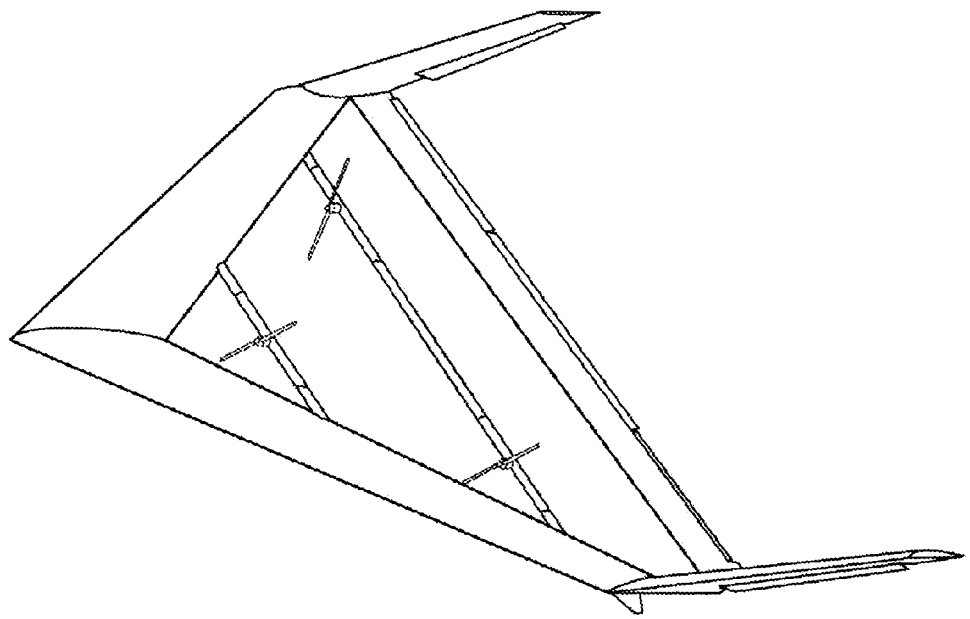
FIGS. 10A and 10B are upper left front perspective view of an alternative of the 2$^{nd}$ embodiment in horizontal flight configuration and VTOL configuration respectively.
Figure 10B:
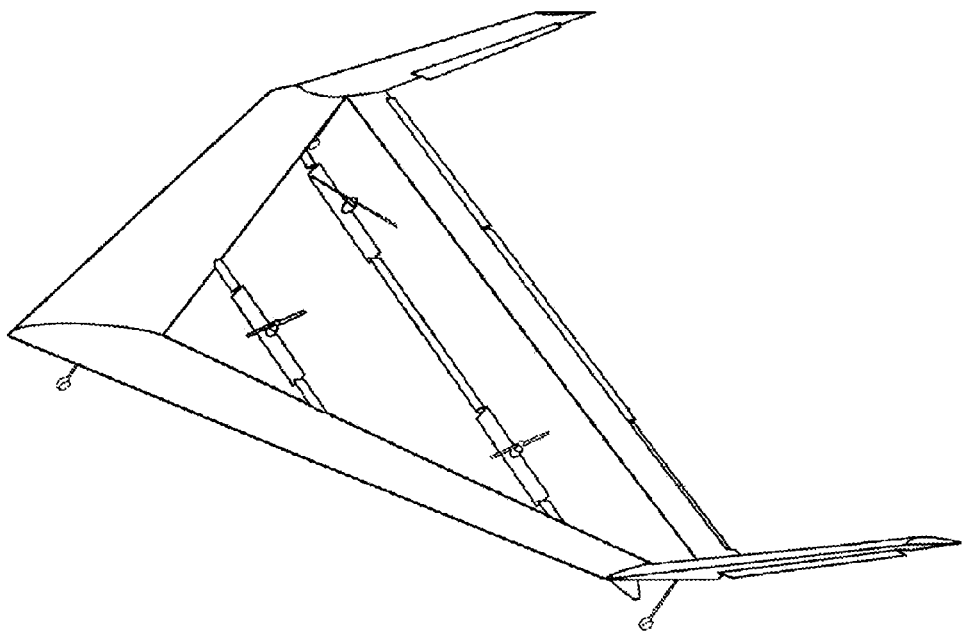

FIGS. 10A to 10B—Alternative of Second Embodiment

An alternative of the second embodiment is illustrated in FIG. 10A (perspective view of normal horizontal flight configuration) and FIG. 10B (perspective view of VTOL configuration with landing gears extended). Comparing to the second embodiment, the structural differences are:
1. In the alternative embodiment, 2 rear thrust generators and rear beam are moved forward to give room to horizontal stabilizer.
2. In the alternative embodiment, horizontal stabilizer is disposed between rear ends of left and right wing, and is connected to rear ends of left and right wing.
3. In the alternative embodiment, a fuselage is disposed between front and rear beam, and connected to the middle sections of front and rear beam.

OPERATION

FIGS. 10A to 10B—Alternative of Second Embodiment

The alternative embodiment illustrated in FIGS. 10A and 10B operates in the same way as the second embodiment illustrated in FIGS. 9A and 9B.

DETAILED DESCRIPTION

Figure 11A:
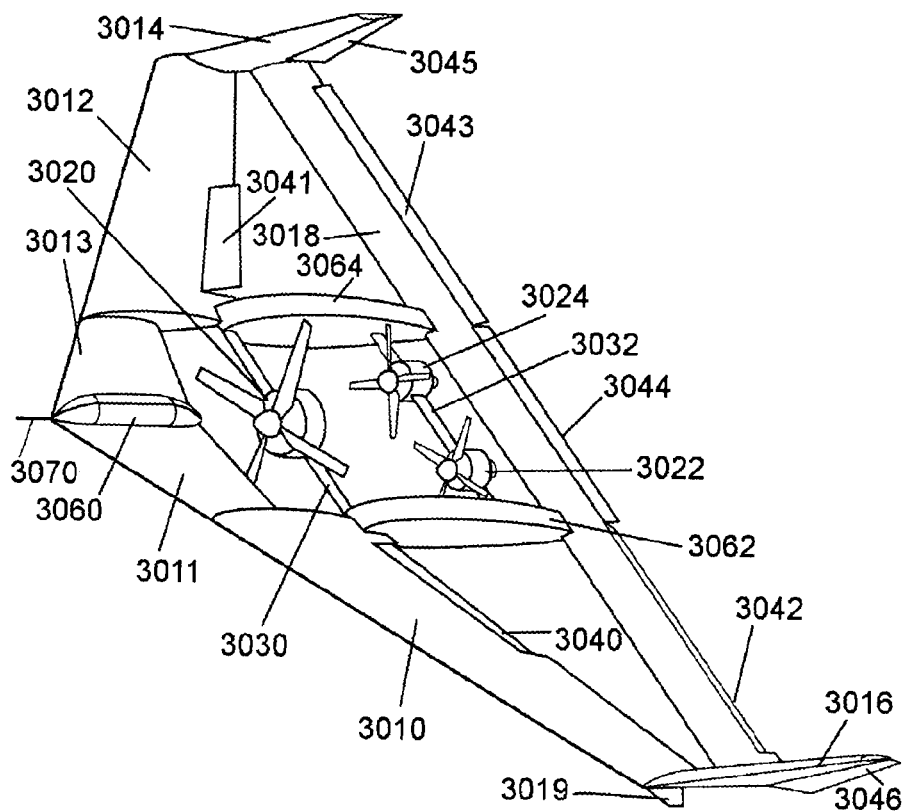
FIGS. 11A, 11B and 11C are upper left front perspective view of the 3$^{rd}$ embodiment in horizontal flight configuration, VTOL configuration and folded ground vehicle configuration respectively.
Figure 11B:
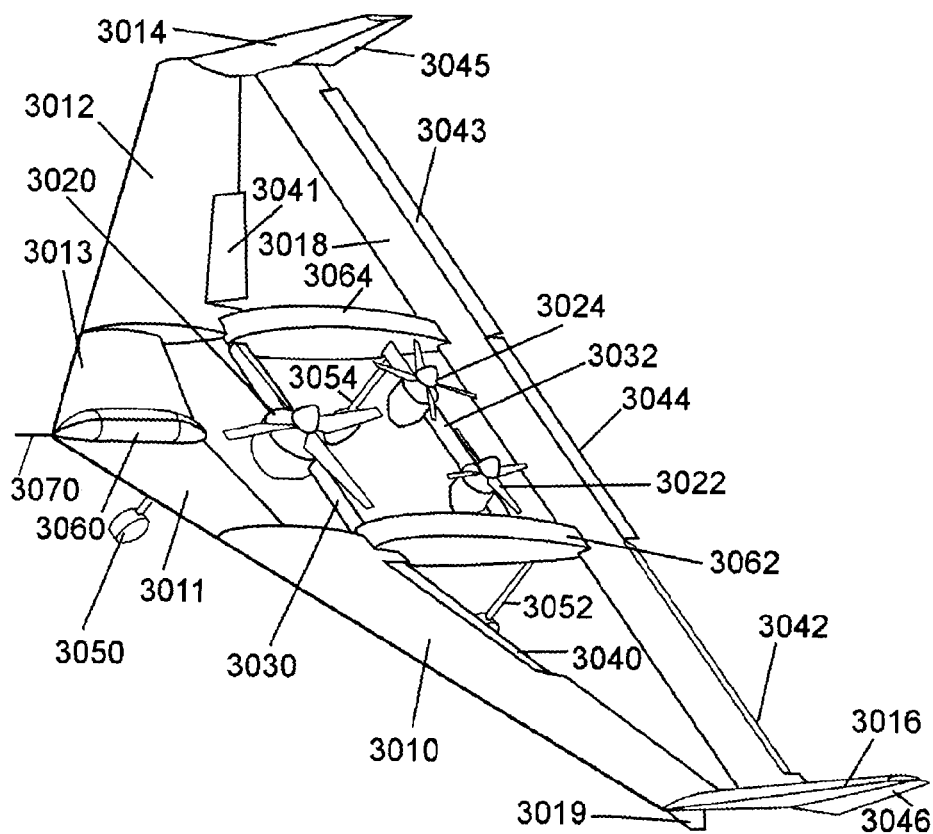
Figure 11C:
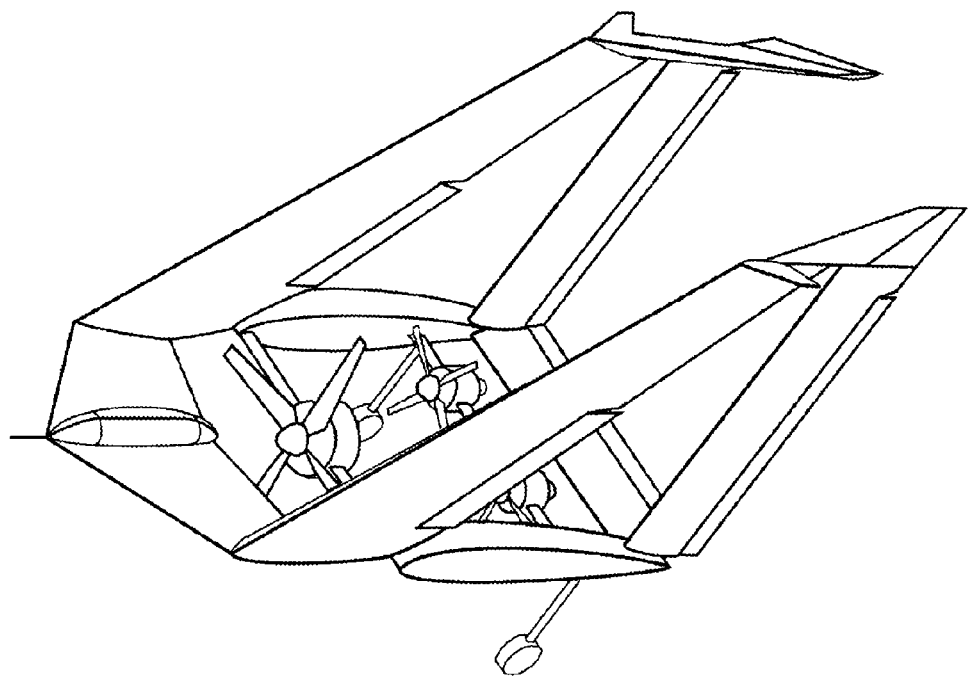

FIGS. 11A to 11C—Third Embodiment

The third embodiment is illustrated in FIG. 11A (perspective view of normal horizontal flight configuration), FIG. 11B (perspective view of VTOL configuration with landing gears extended) and FIG. 11C (perspective view of ground vehicle configuration with wings folded). It's derived from the embodiment illustrated in FIGS. 10A and 10B. Comparing to the embodiment illustrated in FIGS. 10A and 10B, the structural changes are:
1. In order to give room so that front thrust generator 3020 can be moved forward, the cord lengths of 2 wing segments which are closer to center rolling axis are reduced, and therefore these 2 wing segments become another set of wings. Now roots of left minor wing 3011 and right minor wing 3013 joint together at the head of vehicle. Roots of left major wing 3010 and right major wing 3012 are connected to tips of left minor wing 3011 and right minor wing 3013 respectively.
2. Front fuselage 3060 is disposed at roots of left minor wing 3011 and right minor wing 3013. There are 2 new side fuselages. Front ends of left side fuselage 3062 and right side fuselage 3064 connect to roots of left major wing 3010 and right major wing 3012 respectively. The side fuselages run parallel to rolling axis. Rear ends of left side fuselage 3062 and right side fuselage 3064 connect to horizontal stabilizer 3018.
3. Instead of connections to wings, front beam 3030 and rear beam 3032 now connect to the side fuselages.
4. Front landing gear 3050, left rear landing gear 3052 and right rear landing gear 3054 are disposed at rear segments and front fuselage 3060, left side fuselage 3062 and right side fuselage 3064 respectively. They rotate back and forth around axes parallel to pitching axis to extended and retracted positions.
5. Docking probe 3070 is mounted to head of the vehicle, and corresponding drogues are embedded in 2 ends of horizontal stabilizer. Please refer to section of embodiments of formation for more details.

OPERATION

FIGS. 11A to 11C—Third Embodiment

There is a new operation mode: ground vehicle mode. In ground vehicle mode, left major wing 3010, right major wing 3012, left vertical stabilizer 3016 and right vertical stabilizer 3014, left lower wing tip 3019 and right lower wing tip 3017 (obstructed in FIGS. 11A and 11B), left and right segment of horizontal stabilizer 3018 are folded up by rotating around the side fuselages. Front landing gear 3050 acts as steering wheel to turn the vehicle. To move forward, thrust generators are generally facing forward. To move backward, thrust generators are generally facing upward and tilted backward.

In all other modes, the third embodiment operates in the same way as the embodiment in FIGS. 10A and 10B.

DETAILED DESCRIPTION

Figure 12A:
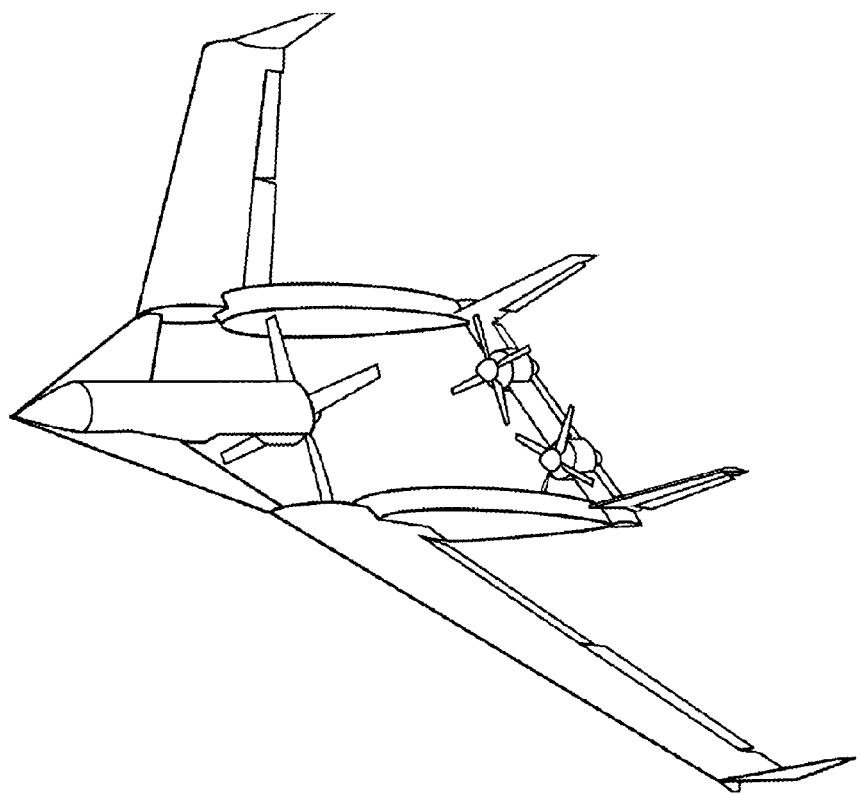
FIGS. 12A, 12B and 12C are upper left front perspective view of alternative 1 of the 3$^{rd}$ embodiment in horizontal flight configuration, VTOL configuration and folded ground vehicle configuration respectively.
Figure 12B:
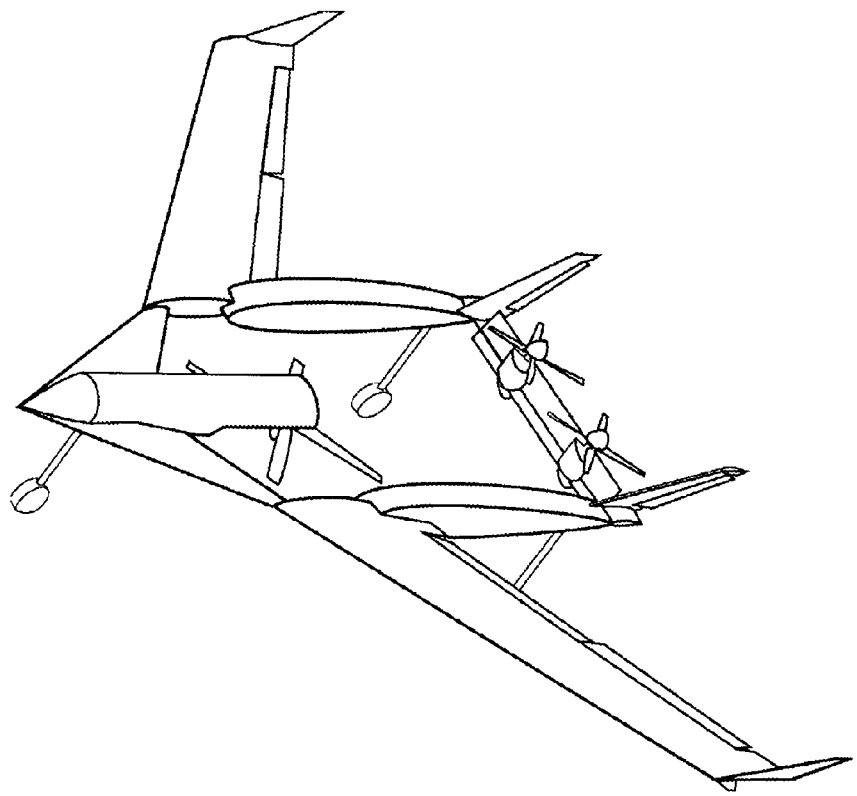
Figure 12C:
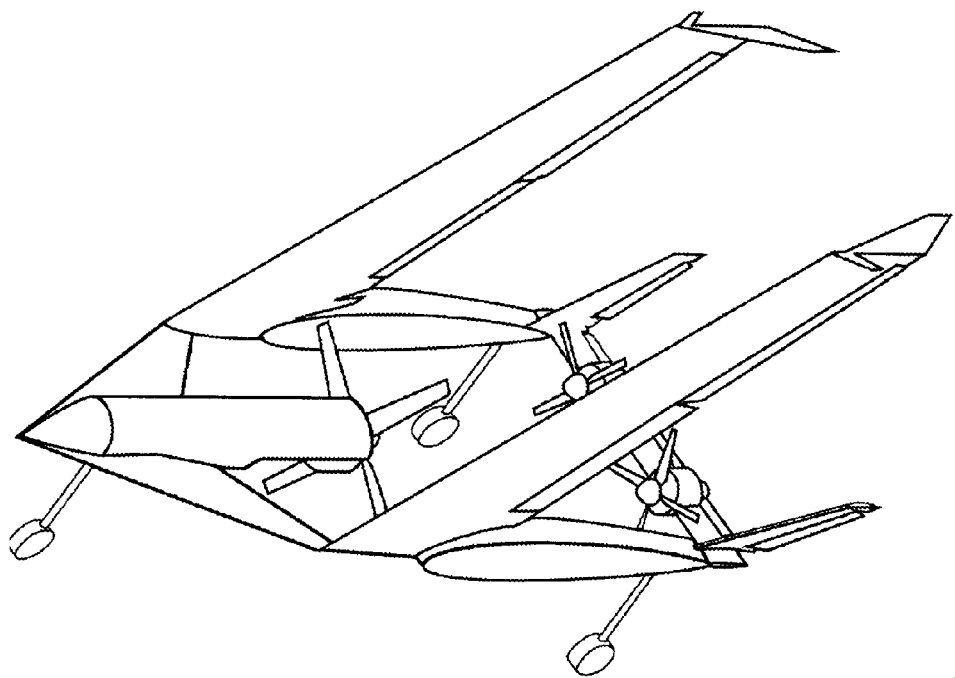

FIGS. 12A to 12C—Alternative 1 of Third Embodiment

An alternative of the third embodiment is illustrated in FIG. 12A (perspective view of normal horizontal flight configuration), FIG. 12B (perspective view of VTOL configuration with landing gears extended) and FIG. 12C (perspective view of ground vehicle configuration with wings folded). Comparing to the third embodiment, the structural differences are:
1. Front minor wings are swept further backward, and moved further forward so that front thrust generator is able to be moved further forward. Leading edge of a front minor wing is not in the same line of leading edge of a major wing on the same side.
2. Front fuselage extended backward to where front thrust generator is.
3. Length of horizontal stabilizer is shortened so that it does not extend beyond rear end of side fuselages.
4. Rear thrust generators are moved backward and disposed on the horizontal stabilizer. Since now rear thrust generators are supported by horizontal stabilizer, there is no rear beam.

OPERATION

FIGS. 12A to 12C—Alternative 1 of Third Embodiment

The alternative embodiment illustrated in FIGS. 12A, 12B and 12C operates in the same way as the third embodiment illustrated in FIGS. 11A, 11B and 11C.

DETAILED DESCRIPTION

Figure 13:
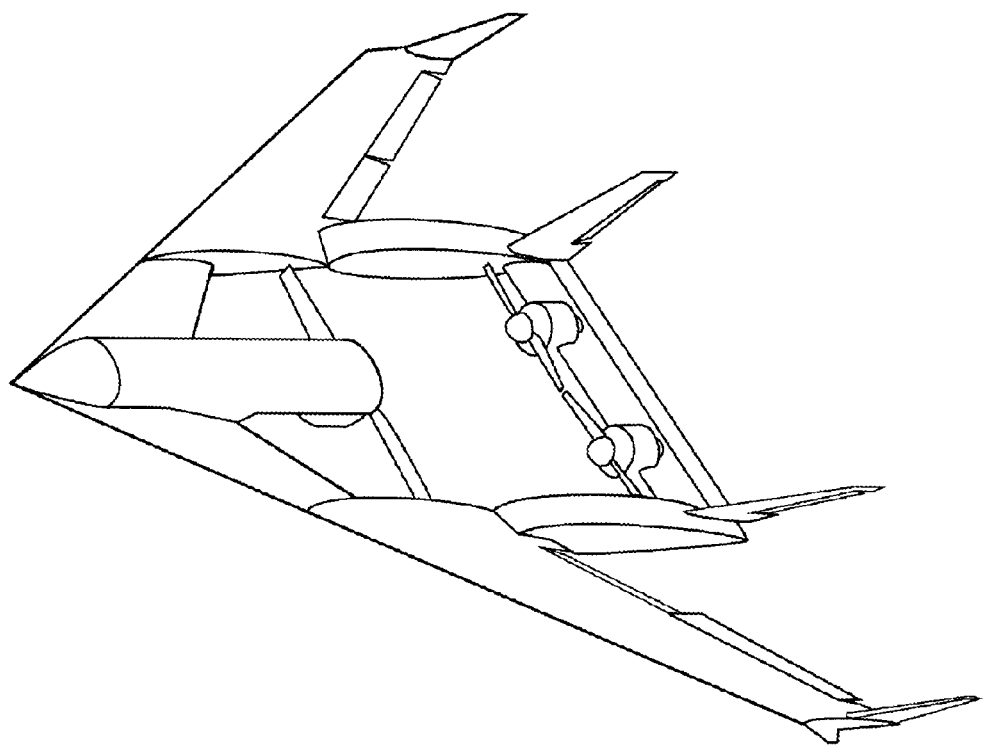
FIG. 13 is an upper left front perspective view of alternative 2 of the 3$^{rd}$ embodiment in horizontal flight configuration.

FIG. 13—Alternative 2 of Third Embodiment

An alternative of the third embodiment is illustrated in FIG. 13. It has the same structure as alternative 1 (shown in FIG. 12A to 12C) of the third embodiment, except major wings are also further swept back so that the leading edges of front minor wings are in the same line of leading edges of corresponding major wings.

OPERATION

FIG. 13—Alternative 2 of Third Embodiment

The alternative embodiment illustrated in FIG. 13 operates in the same way as the third embodiment illustrated in FIGS. 11A, 11B and 11C.

DETAILED DESCRIPTION

Figure 14A:
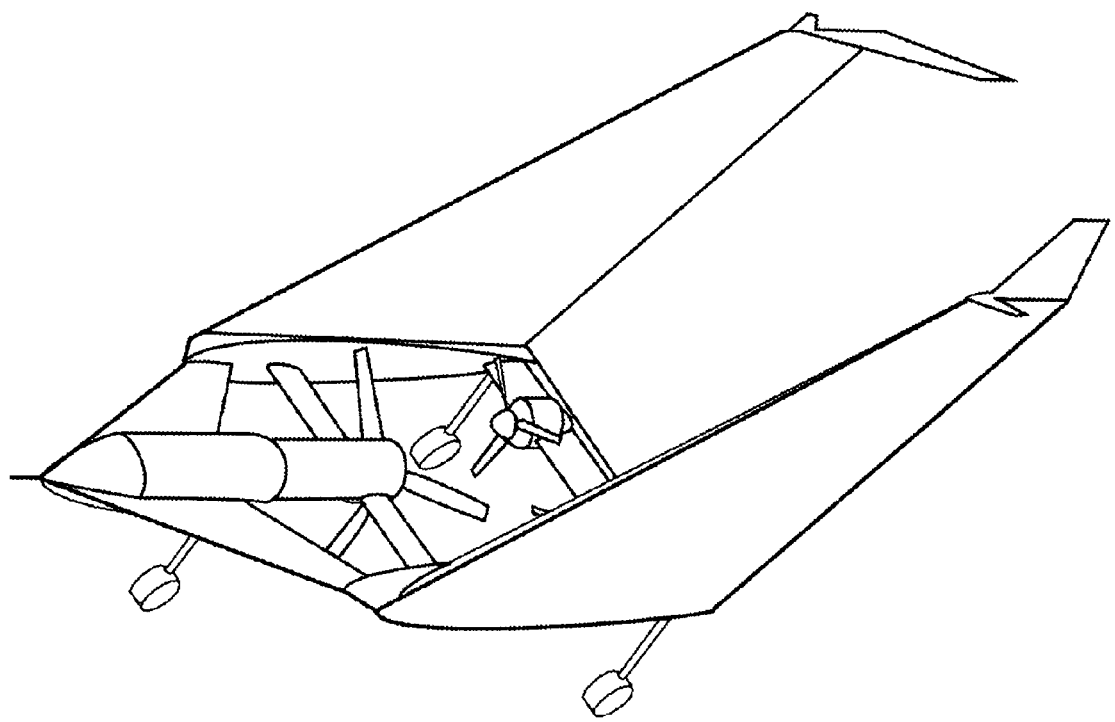
FIGS. 14A, 14B and 14C are upper left front perspective view of alternative 3 of the 3$^{rd}$ embodiment in folded ground vehicle configuration, horizontal flight configuration and VTOL configuration respectively.
Figure 14B:
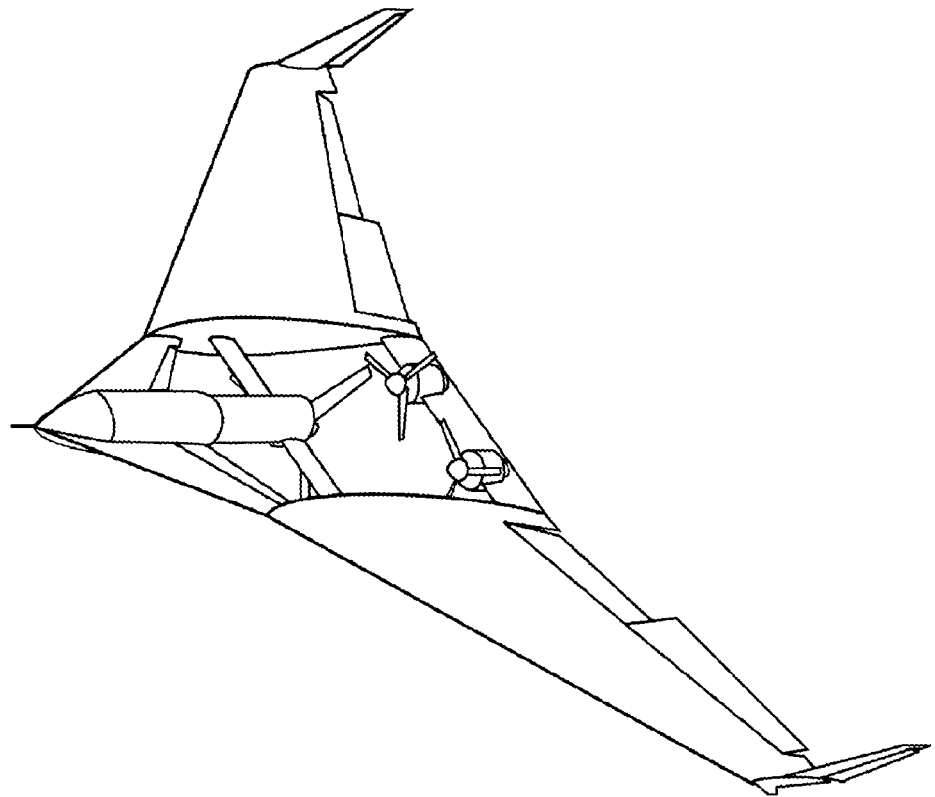
Figure 14C:
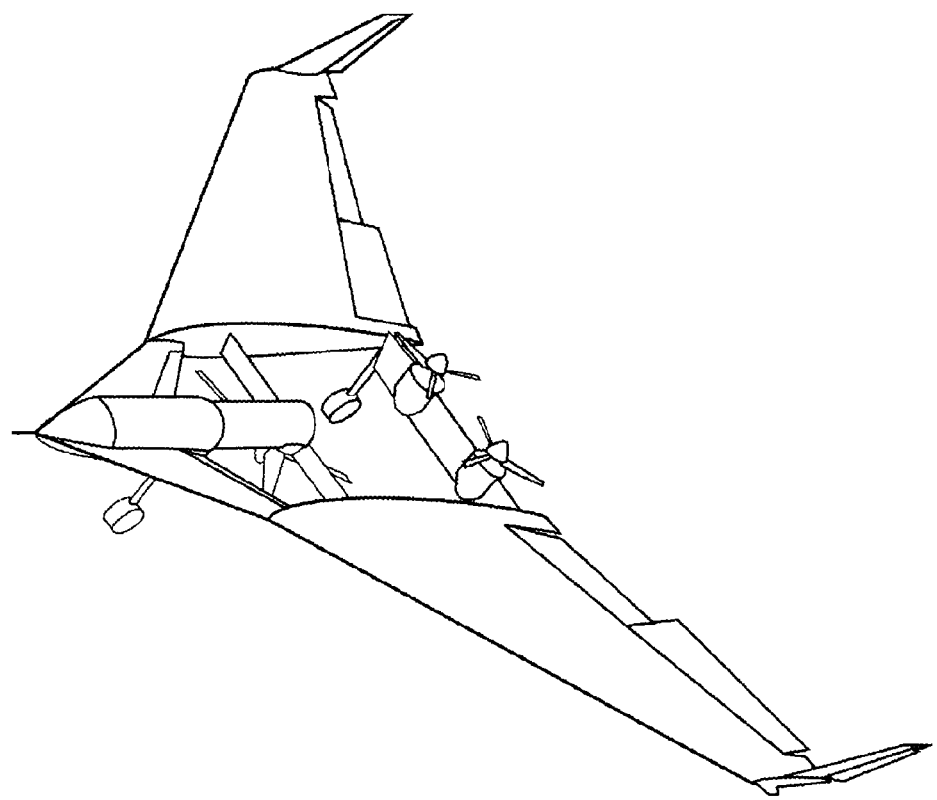

FIGS. 14A to 14C—Alternative 3 of Third Embodiment

An alternative of the third embodiment is illustrated in FIG. 14B (perspective view of normal horizontal flight configuration), FIG. 14C (perspective view of VTOL configuration with landing gears extended) and FIG. 14A (perspective view of ground vehicle configuration with wings folded). It has the same structure as alternative 1 (shown in FIG. 12A to 12C) of the third embodiment, except the following changes:
1. Side fuselage are extended forward so that they are between and connected to tips of corresponding minor wings and roots of corresponding major wings.
2. Major wings are widened and extended backward so that rear ends of roots of major wings are approximately connected to corresponding rear ends of side fuselages.
3. When side fuselages also take shape of root of major wing, a side fuselage and a major wing on the same side looks like one wing in the horizontal flight configuration.

OPERATION

FIGS. 14A to 14C—Alternative 3 of Third Embodiment

Alternative 3 illustrated in FIGS. 14B, 14C and 14A operates in the same way as the alternative 2 illustrated in FIG. 13.

DETAILED DESCRIPTION

Figure 15A:
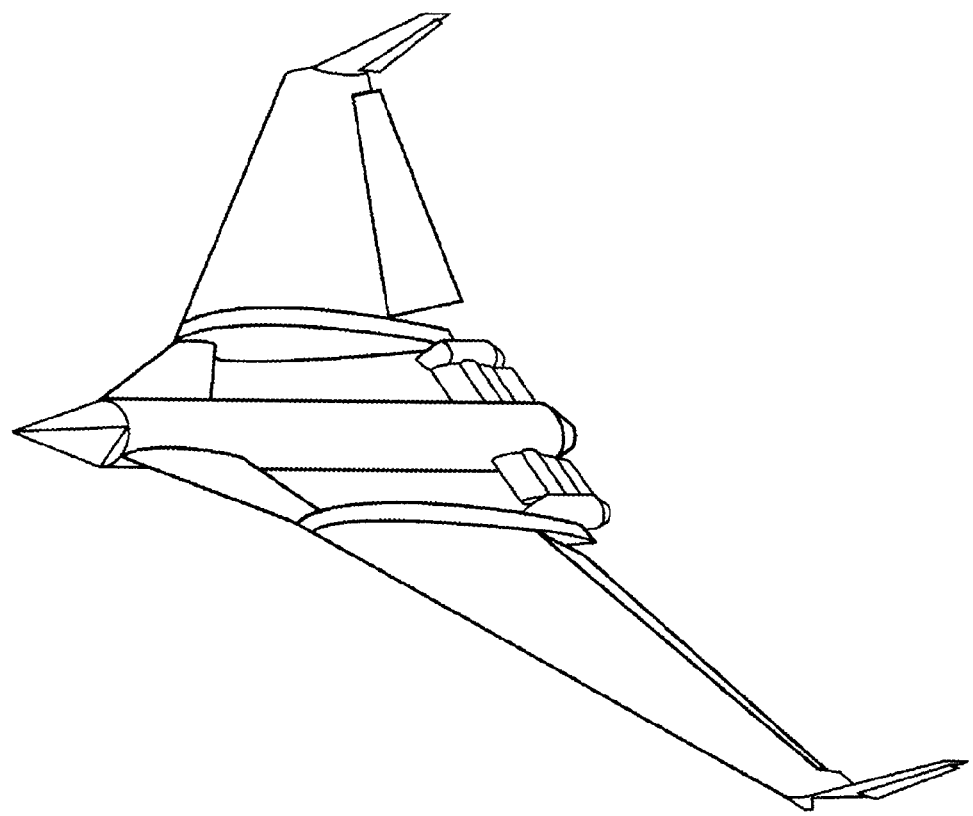
FIGS. 15A, 15B and 15C are upper left front perspective view of alternative 4 of the 3$^{rd}$ embodiment in horizontal flight configuration, VTOL configuration and folded ground vehicle configuration respectively.
Figure 15B:
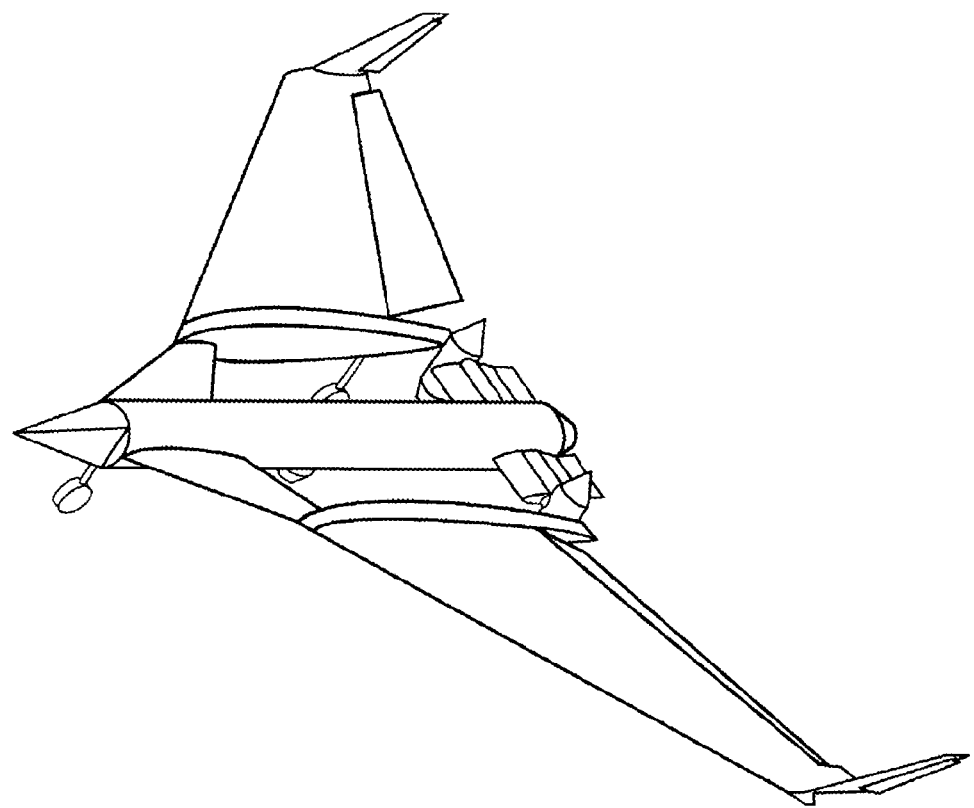
Figure 15C:
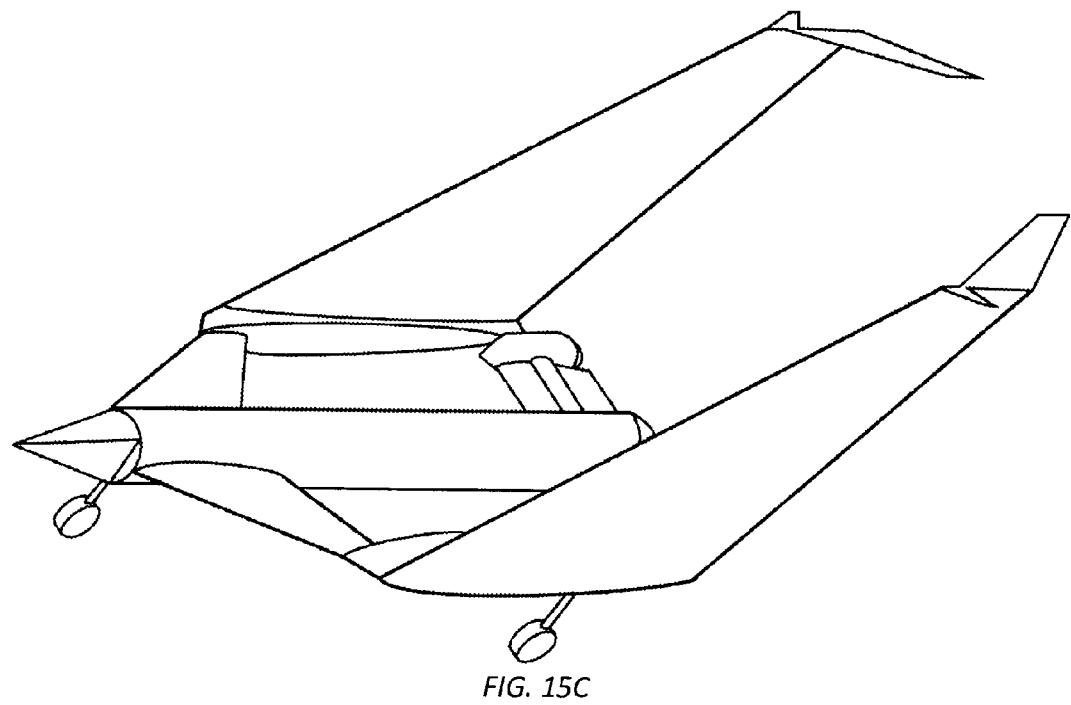

FIGS. 15A to 15C—Alternative 4 of Third Embodiment

An alternative of the third embodiment is illustrated in FIG. 15A (perspective view of normal horizontal flight configuration), FIG. 15B (perspective view of VTOL configuration with landing gears extended) and FIG. 15C (perspective view of ground vehicle configuration with wings folded). It's a specialized form of alternative embodiment 3 (shown in FIG. 14A to 14C) of the third embodiment. It has the same structure as alternative embodiment 3, except the following changes:
1. Thrust generators are now in specialized form: jet nozzles.
2. Front fuselage is extended all the way back to horizontal stabilizer, and becomes center fuselage. At the front, there are 2 side air inlets of one or more jet engines, which generate air jet stream, which is further split into 3 air jet streams: center one and 2 side ones. Two side air jet streams are routed to 2 rear side nozzles by pipes. In VTOL mode, side air jet streams exit from side nozzles pointing in general downward direction, and center air jet stream goes to front center nozzle, which is disposed in the middle section of center fuselage, and ejects air from the nozzle downward to produce lift. In horizontal flight mode, front center nozzle is rotated to face backward and allow center air jet stream to go to rear center nozzle, which is facing backward, and side nozzles can be shut off.

OPERATION

FIGS. 15A to 15C—Alternative 4 of Third Embodiment

Alternative 4 illustrated in FIGS. 15A, 15B and 15C, operates in the same way as the alternative 3 illustrated in FIGS. 14A, 14B and 14C.

DETAILED DESCRIPTION

Figure 16A:
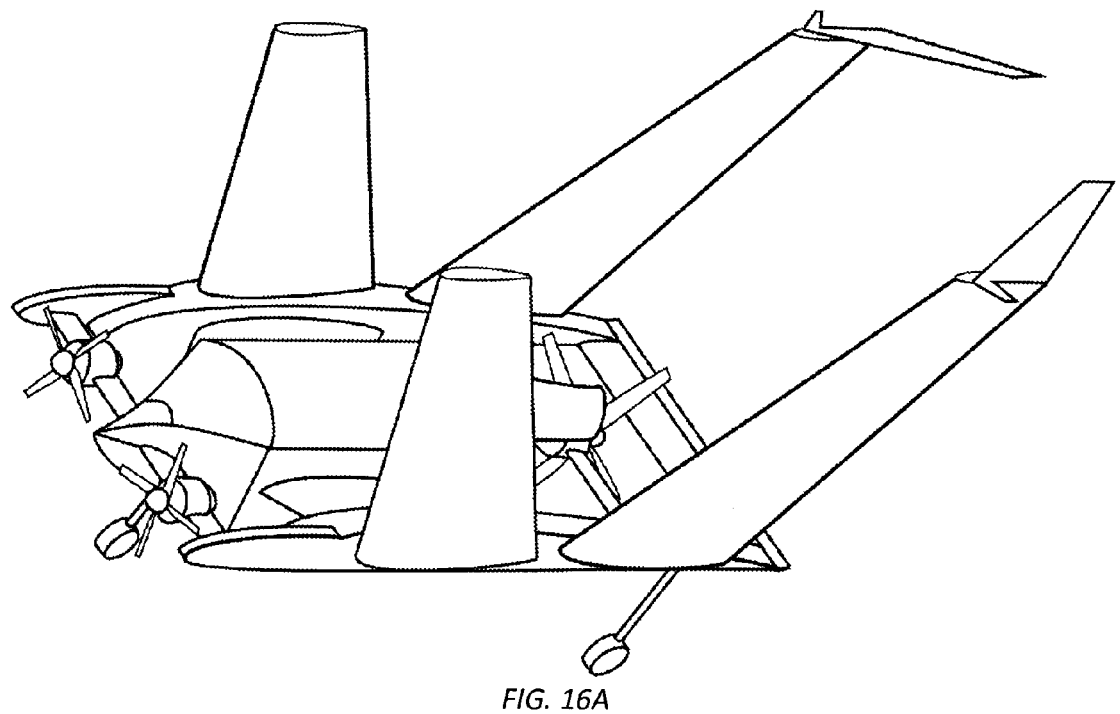
FIGS. 16A, 16B and 16C are upper left front perspective view of the 4$^{th}$ embodiment in folded ground vehicle configuration, horizontal flight configuration and VTOL configuration respectively.
Figure 16B:
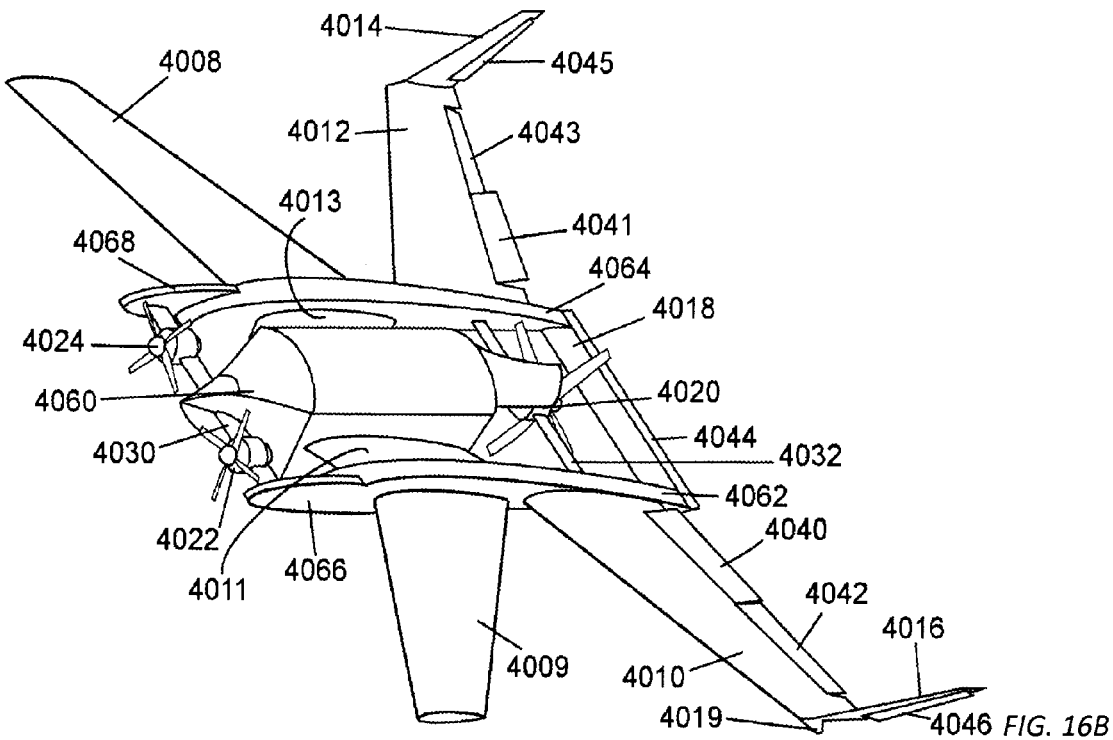
Figure 16C:
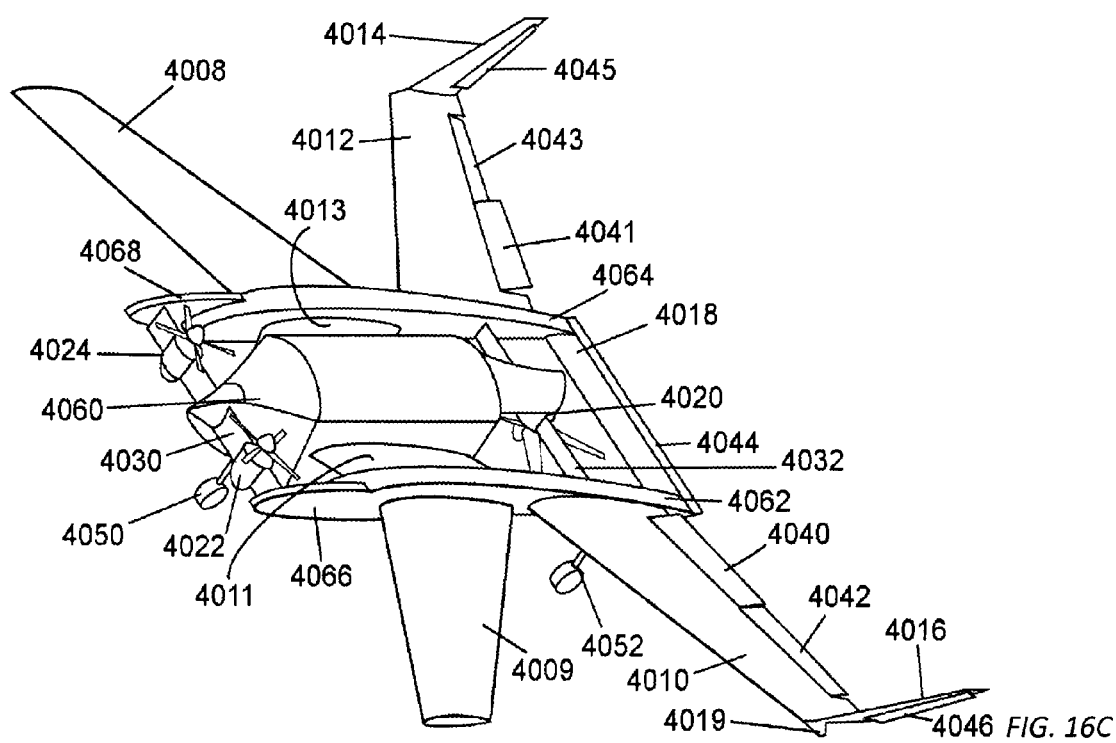
Figure 16D:
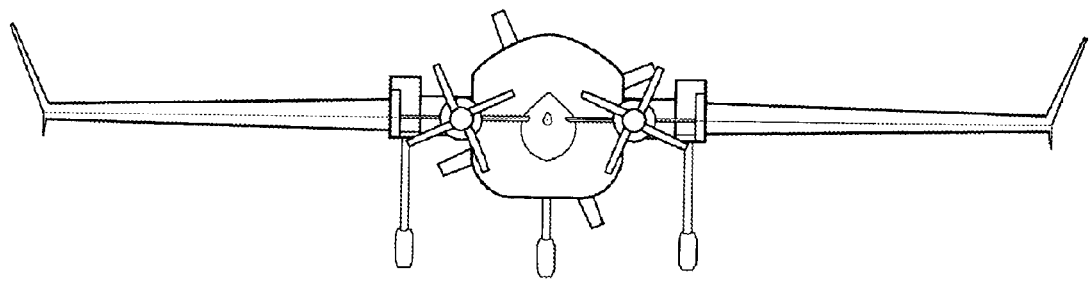
FIGS. 16D and 16E are front view of the 4$^{th}$ embodiment with vertical stabilizer in winglet configuration and in upright vertical position respectively.
Figure 16E:
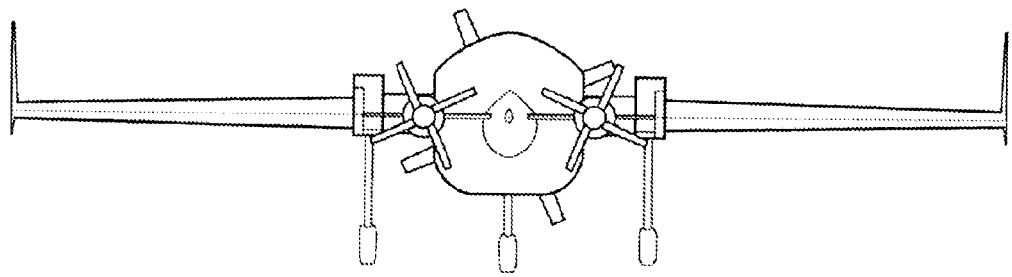

FIGS. 16A to 16C—Forth Embodiment

The forth embodiment is illustrated in FIG. 16B (perspective view of normal horizontal flight configuration), FIG. 16C (perspective view of VTOL configuration with landing gears extended), FIG. 16A (perspective view of ground vehicle configuration with wings folded), FIG. 16D (front view with vertical stabilizer in winglet configuration) and FIG. 16E (front view with vertical stabilizer in up right vertical position). The upright vertical configuration of vertical stabilizer is used in formation flight. Overall structure of the forth embodiment can be generally viewed as 2 V shape wings connected head to head and formed general X shape.

Roots of inner wing 4011 and 40013 are connected to center fuselage 4060 at its left and right side respectively. Tips of inner wing 4011 and 40013 are connected to side fuselage 4062 and 4064 respectively. Roots of left front wing 4009 and left rear wing 4010 are connected to left side of left side fuselage 4062. Roots of right front wing 4008 and right rear wing 4012 are connected to right side of right side fuselage 4064. Left vertical stabilizer 4016 and right vertical stabilizer 4014 are connected to tips of left rear wing 4010 and right rear wing 4012 respectively. Horizontal stabilizer 4018 is disposed between 2 side fuselages. Left and right tip of horizontal stabilizer 4018 are connected to rear ends of fuselage 4062 and 4064 respectively.

Rear thrust generator 4020 is disposed at the intersection of tail of center fuselage 4060 and ream beam 4032. Two ends of rear beam 4032 are connected to inner sides of fuselage 4062 and 4064. Rear end of left front mini side fuselage 4066 is connected to left side of front end of left side of fuselage 4062. Rear end of right front mini side fuselage 4068 is connected to right side of front end of right side of fuselage 4064. Two ends of front beam 4030 are connected to inner sides of front mini side fuselage 4066 and 4068. Front beam 4030 passes through center fuselage 4060. Front left thrust generator 4022 and front right thrust generator 4024 are disposed at left and right side of front beam 4030 respectively.

Front landing gear 4050 is connected to the front bottom side of center fuselage 4060. It rotates back and forth to its retracted and extended position respectively. Left landing gear 4052 is connected to the rear bottom side of left side fuselage 4062. It rotates left and right to its retracted and extended position respectively. Right landing gear 4054 (obstructed in FIGS. 16B and 16C) is connected to the rear bottom side of right side fuselage 4064. It rotates right and left to its retracted and extended position respectively.

OPERATION

FIGS. 16A to 16E—Forth Embodiment

The forth embodiment illustrated in FIG. 16A to 16E operates in the same way as the alternative embodiment 3 (of the third embodiment) illustrated in FIGS. 14A, 14B and 14C. Moment component calculation equation (9)-(11) apply to both embodiments despite the reverse order of center thrust generator and 2 side thrust generators, so the way to control rotation motion is the same for both embodiments. And the reverse order of thrust generators does not affect the way to control translational motion.

DETAILED DESCRIPTION

Figure 17:
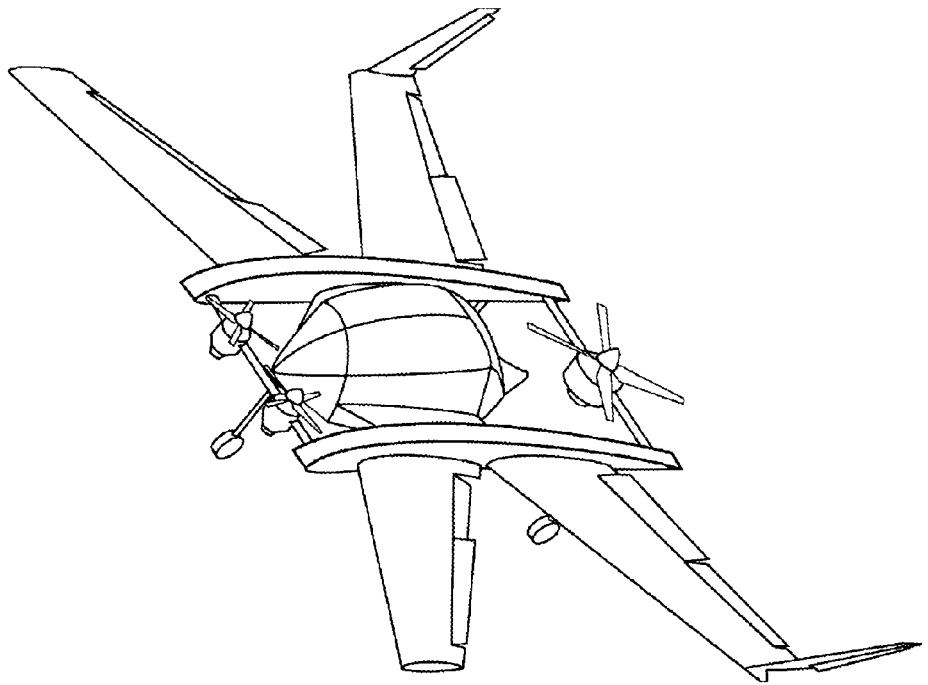
FIG. 17 is an upper left front perspective view of alternative 1 of the 4$^{th}$. Fuselage of this alternative embodiment is in shape of Goldschmied airfoil.

FIG. 17—Alternative 1 of Forth Embodiment

Figure 4:
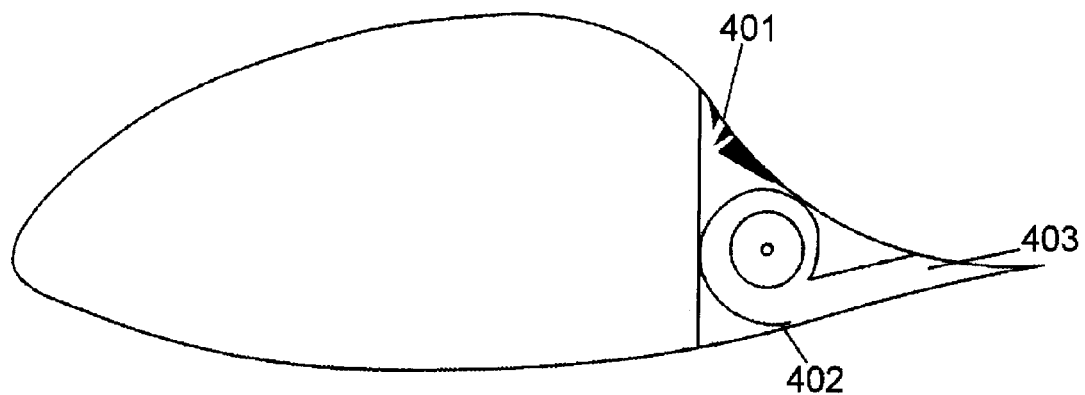
FIG. 4 illustrates Goldschmied airfoil.

An alternative of the forth embodiment is illustrated in FIG. 17 (perspective view. It has the same structure as the forth embodiment, except center fuselage is in shape of Goldschmied airfoil shown in FIG. 4 in order to reduce drag and increase lift, and horizontal stabilizer is removed. The pitching rotation is controlled by flaperon of the pivotable control surface disposed at trailing edge close to root of 2 rear wings.

OPERATION

FIG. 17—Alternative 1 of Forth Embodiment

Except there is blower (402 in FIG. 4) to operate in order for center fuselage to function as Goldschmied airfoil, alternative embodiment 1 illustrated in FIG. 17 operates in the same way as the forth embodiment illustrated in FIG. 16A to 16C.

DETAILED DESCRIPTION

Figure 18:
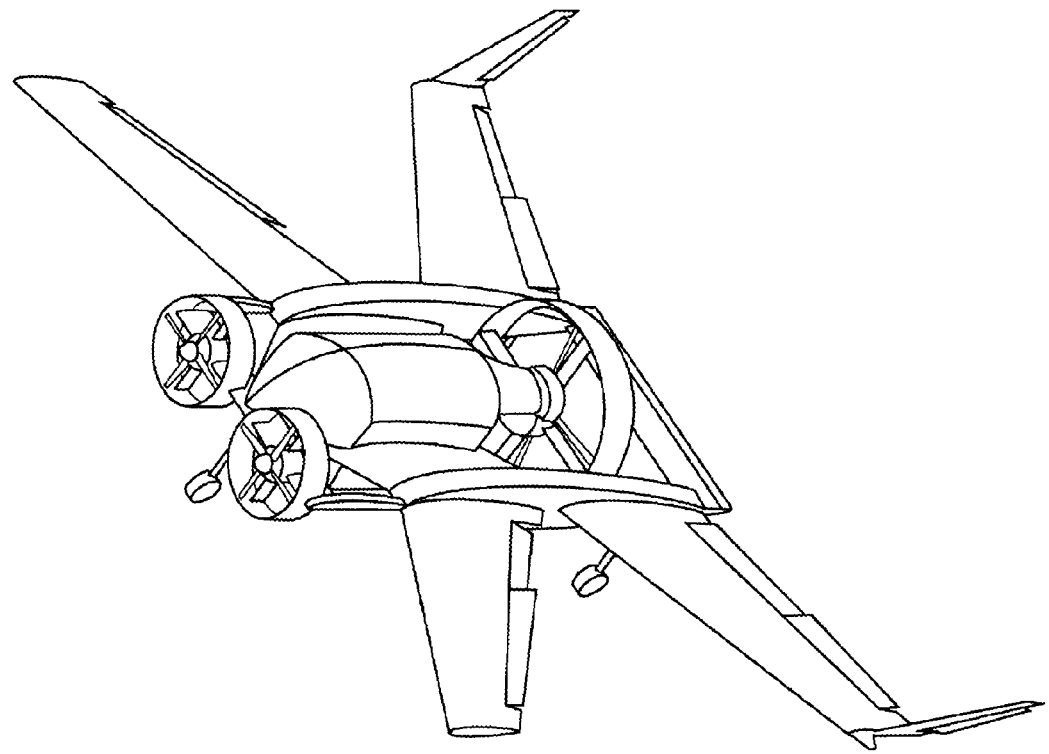
FIG. 18 is an upper left front perspective view of alternative 2 of the 4$^{th}$. Thrust generators of this alternative embodiment are of a particular form: ducted fan.

FIG. 18—Alternative 2 of Forth Embodiment

An alternative of the forth embodiment is illustrated in FIG. 18 (perspective view). It has the same structure as the forth embodiment, except thrust generators are in a particular form of ducted fan.

OPERATION

FIG. 18—Alternative 2 of Forth Embodiment

Alternative embodiment 2 illustrated in FIG. 18 operates in the same way as the forth embodiment illustrated in FIG. 16A to 16C.

DETAILED DESCRIPTION

Figure 19A:
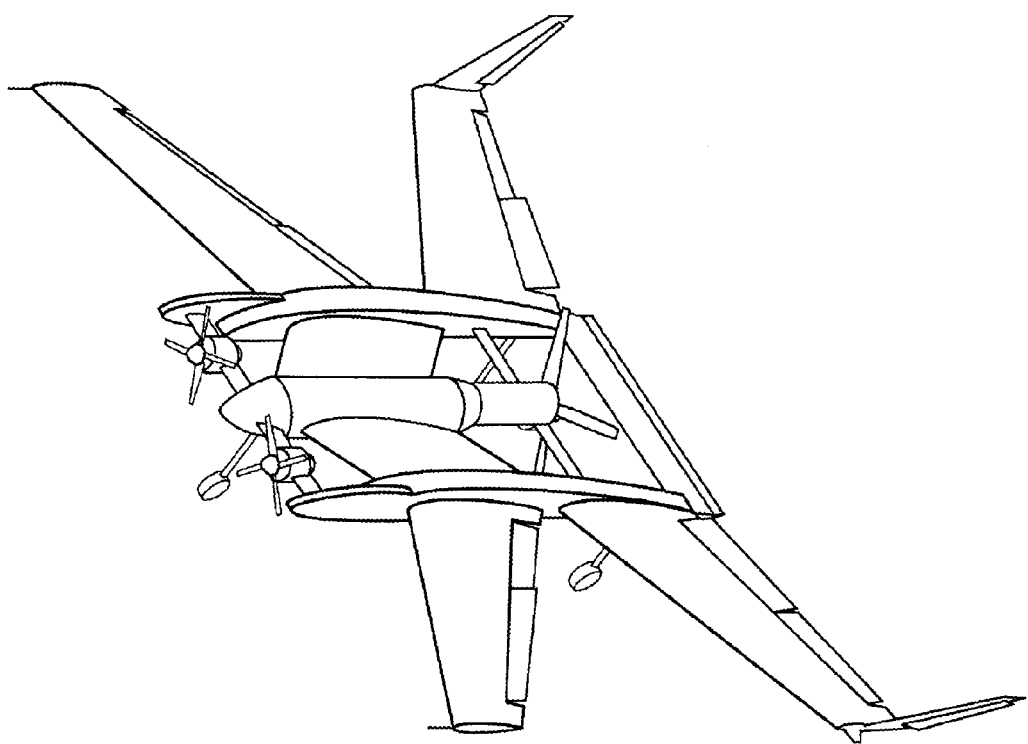
FIG. 19A is an upper left front perspective view of alternative 3 of the 4$^{th}$. Fuselage of this alternative embodiment is slimmer in order to reduce drag. It's intended for unmanned applications.
Figure 19B:
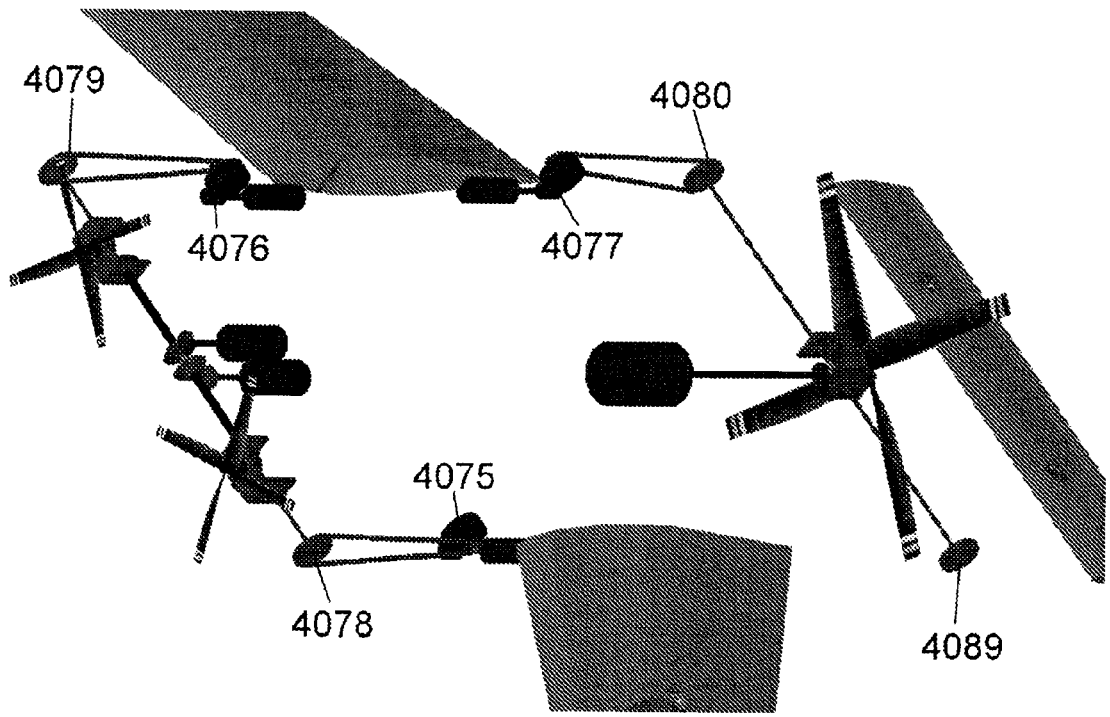
FIGS. 19B and 19C are upper left front perspective view and top view of a particular form of powertrain respectively.
Figure 19C:
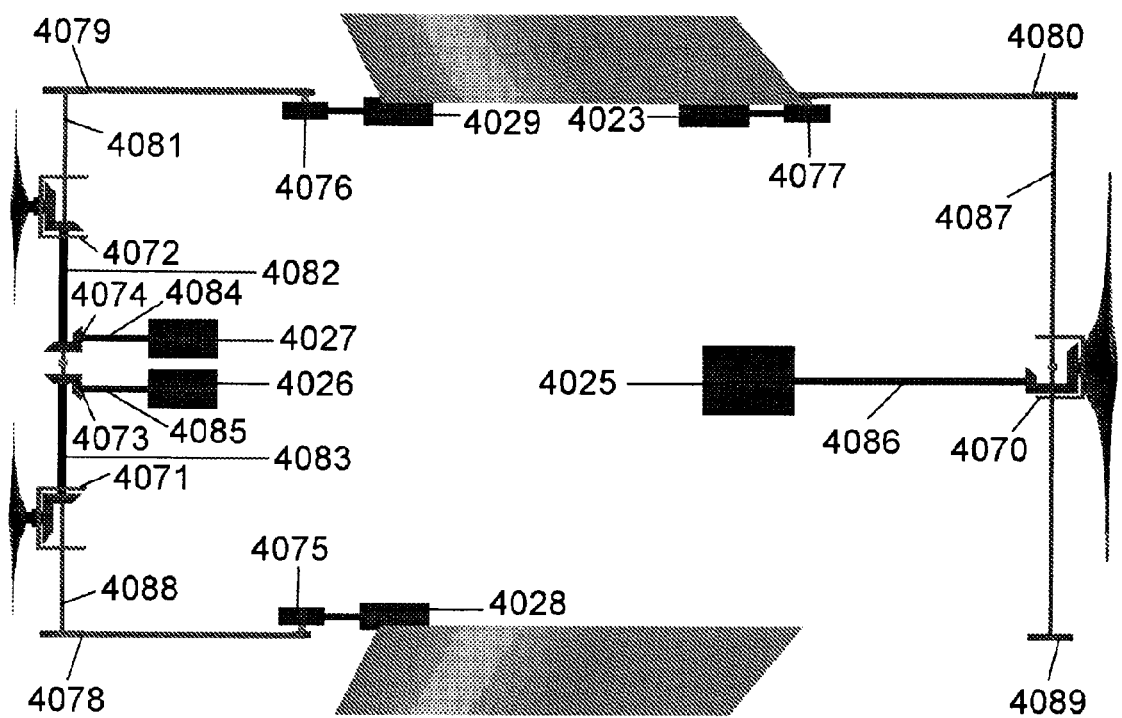
Figure 20A:
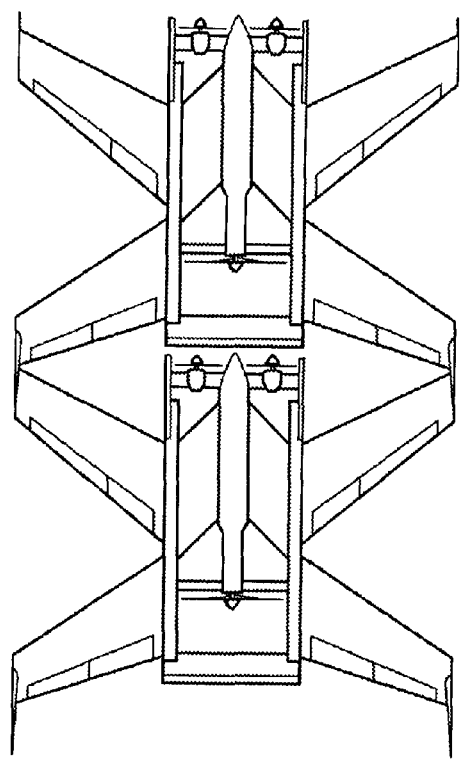
FIG. 20A to 20K are top views of various formation configurations.
Figure 20B:
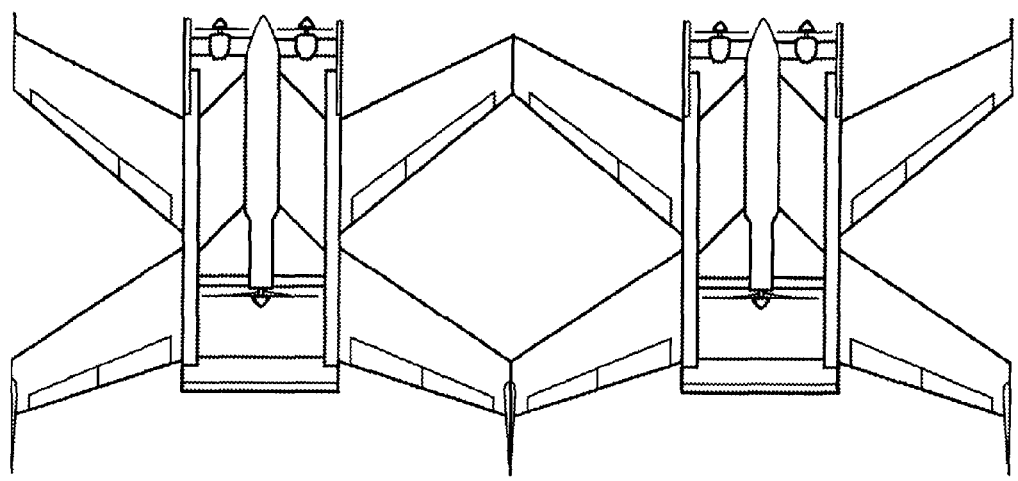
Figure 20C:
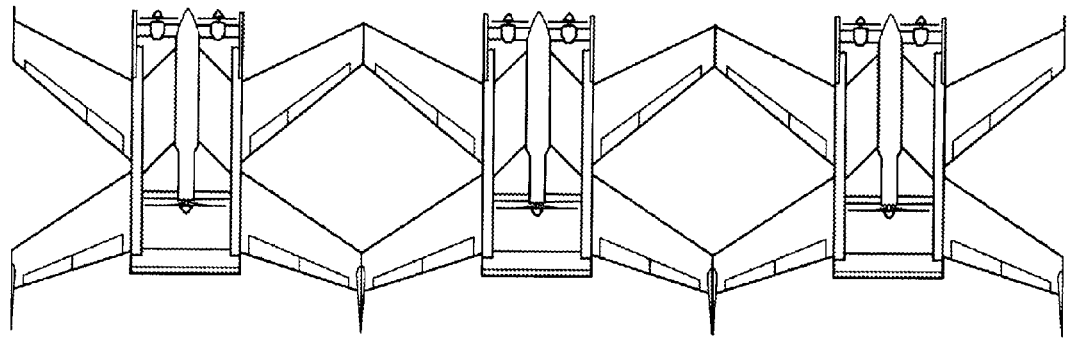
Figure 20D:
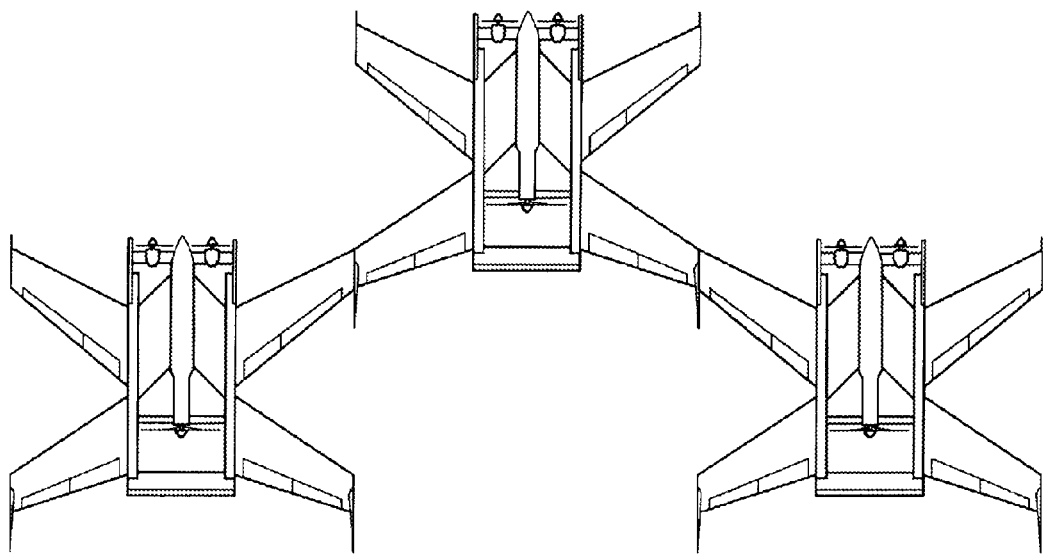
Figure 20E:
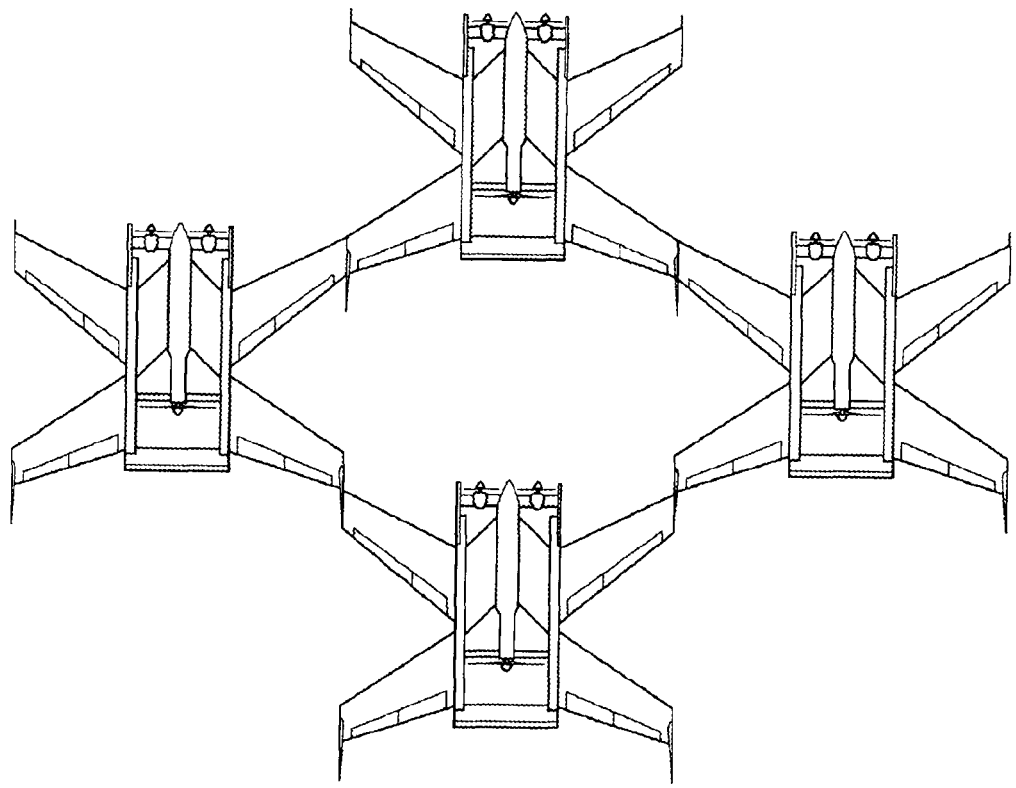
Figure 20F:
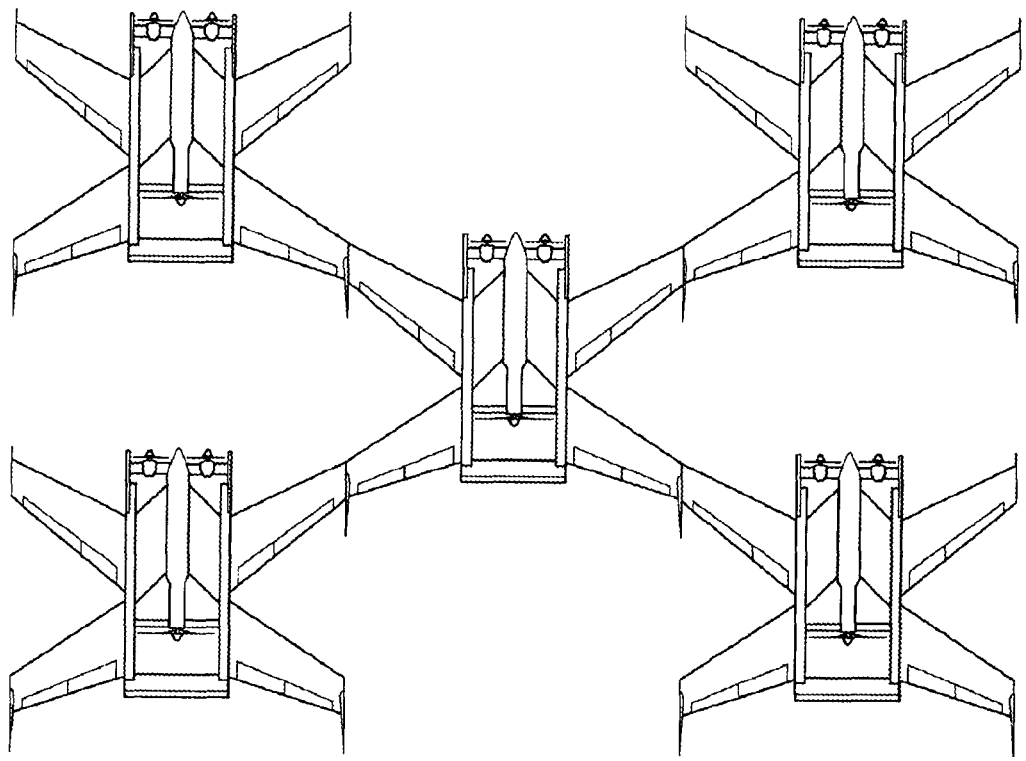
Figure 20G:
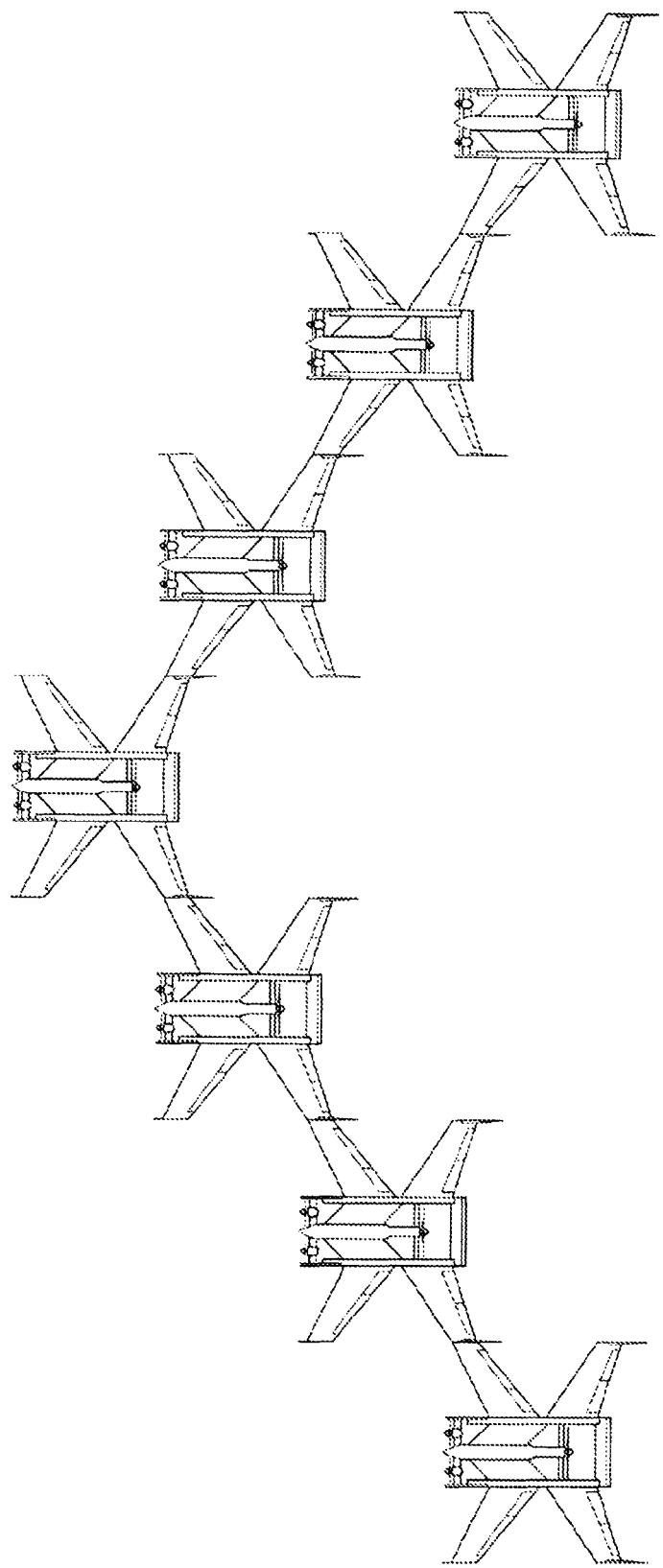
Figure 20H:
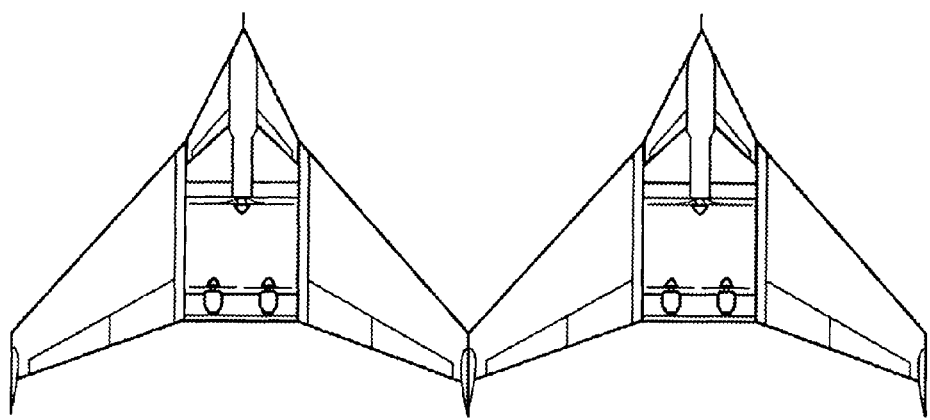
Figure 20I:
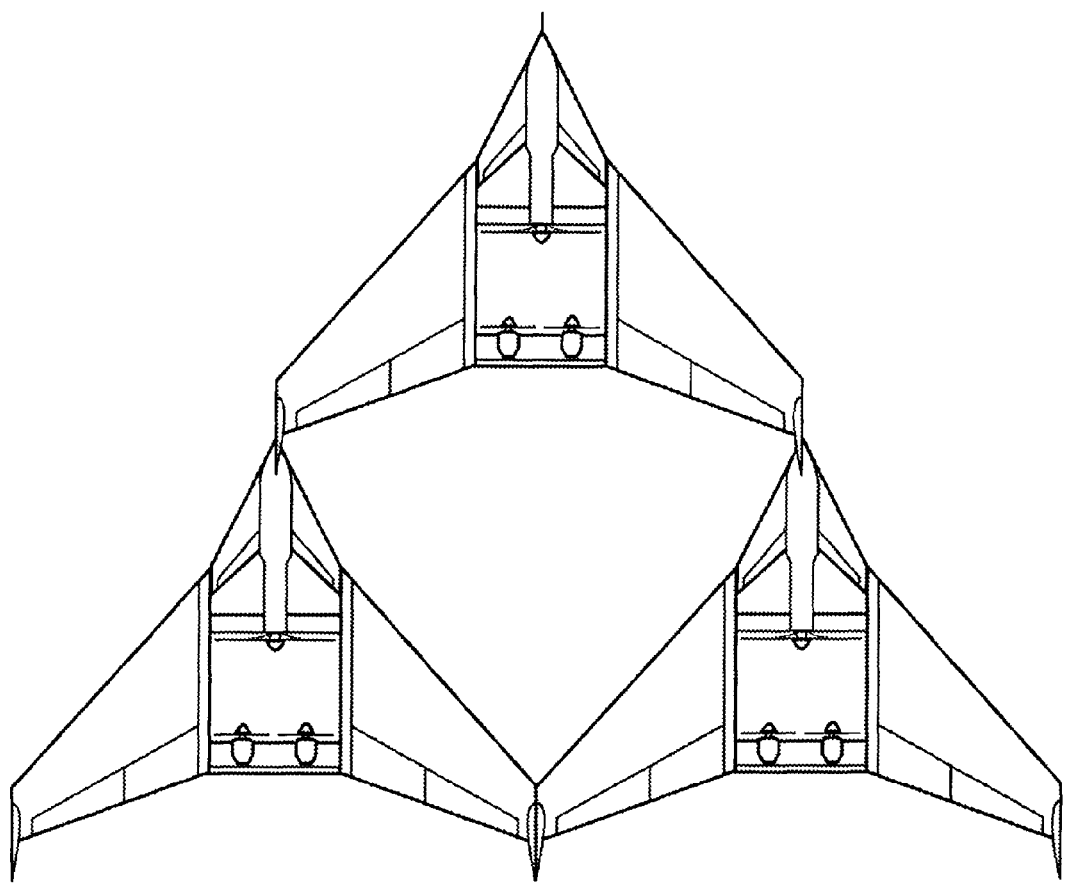
Figure 20J:
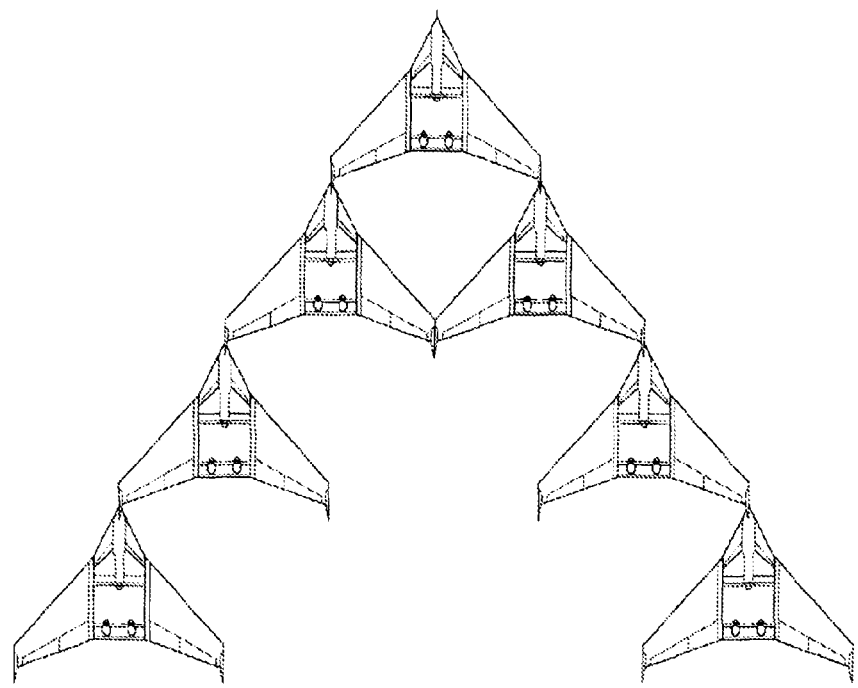
Figure 20K:
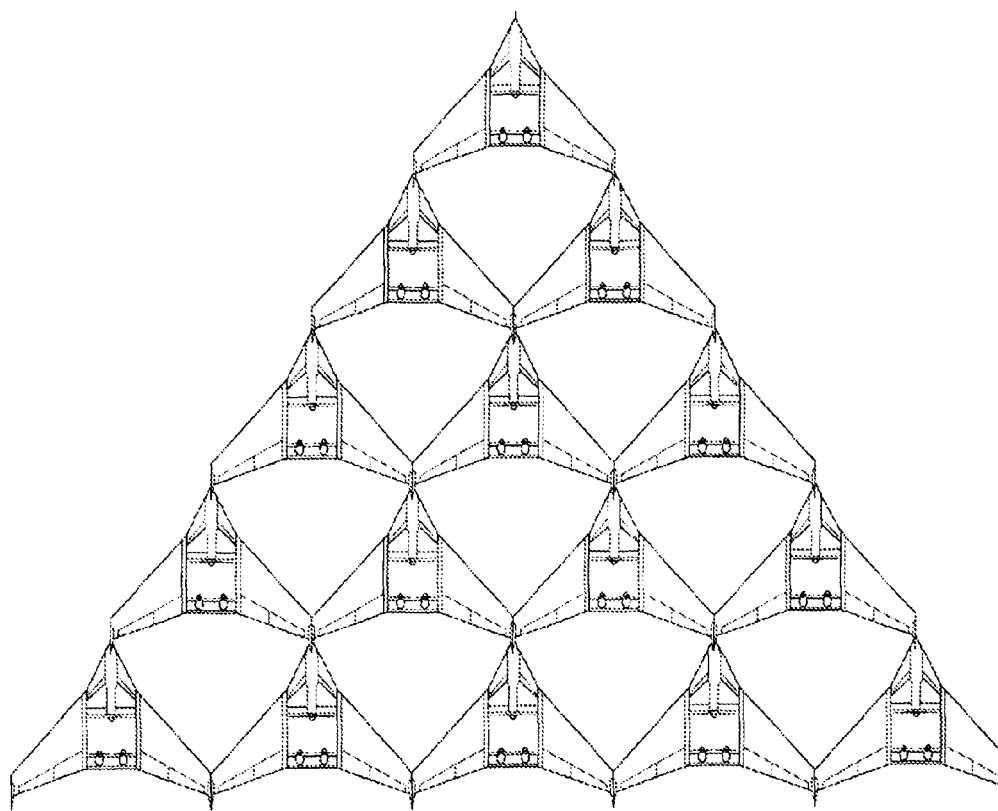

FIG. 19A to 19C—Alternative 3 of Forth Embodiment

An alternative of the forth embodiment is illustrated in FIG. 19A (perspective view). It has the same structure as the forth embodiment, except center fuselage is slimmer in order to reduce drag. It's intended for unmanned applications.

FIGS. 19B and 19C illustrate a particular implementation of powertrain for thrust generation. It's given as an exemplar implementation of powertrain, and it should not be used to limit scope of this invention.

Worm gear set 4075, 4076 and 4077, gear and belt assembly 4078, 4089, and 4080, and bearing 4089 are illustrated better in perspective view FIG. 19B. In top view FIG. 19C, engine 4025 drives shaft 4086, which in turn drives gear box 4070. In gear box 4070, input bevel gear is connected to the end of shaft 4086, and it drives an intermediate bevel gear, which is connected shaft 4087 via a bearing so that rotating shaft 4087 won't cause the intermediate bevel gear to rotate around shaft 4087. The intermediate bevel gear drives output bevel gear. Output bevel gear connects to an output shaft, which is connected to frame of gear box via a bearing. The output shaft drives a propeller. Shaft 4087 is disposed inside ream beam, and runs through gear box 4070. Frame of gear box 4070 is fixed to shaft 4087. 4089 is a bearing supporting shaft 4087 at its un-driven end.

Disposed inside right side fuselage, motor 4023 drives worm gear set 4077, which drives gear and belt assembly 4080, which in turn drives shaft 4087. Shaft 4087 drives gear box frame, which in turn drives the output shaft, the propeller and the output bevel gear to rotate around shaft 4087 while the output bevel gear is maintaining contact with the intermediate bevel gear. Therefore 2D thrust vectoring is realized.

When engine 4026 and 4027 are electric engines, but engine 4025 is not an electric engine, engine 4025 can also drive an electric generator to power engine 4026 and 4027, and store extra electricity into onboard battery.

2D thrust vectoring of 2 front thrust generators works in similar way. Disposed inside front section of center fuselage, engine 4026 and 4027 drive bevel gear set 4073 and 4074 via shaft 4085 and 4084 respectively. Output bevel gears of bevel gear set 4073 and 4074 are connected to shaft 4083 and 4082 respectively. There are bearings between shaft 4081 and 4082, and between shaft 4083 and 4088 so that rotations of shaft 4082 and 4083 are independent of rotations of shaft 4081 and 4088. Shaft 4081 and 4088 rotate independently.

Disposed inside left and right side fuselage respectively, motor 4028 and 4029 drive worm gear 4075 and 4076 respectively. Worm gear 4075 and 4076 drives gear and belt assembly 4078 and 4079, which in turn drive shaft 4088 and 4081 respectively. Shaft 4088 and 4081 drive frames, output bevel gears and propellers associated with gear box 4071 and 4072 to rotate around shaft 4088 and 4081 respectively. Therefore 2D thrust vectoring of 2 front thrust generators is realized.

OPERATION

FIGS. 19A to 19C—Alternative 3 of Forth Embodiment

Alternative embodiment 3 illustrated in FIG. 19A to 19C operates in the same way as the forth embodiment illustrated in FIG. 16A to 16C.

COMBINABILITY

FIGS. 6A to 6C and 20A to 20K—Embodiments of Formation

All embodiments in this invention are designed to be able to combine with other embodiments to form larger vehicles of a wide variety of shapes as shown in FIG. 20A to 20K. The combined vehicles are also capable of VTOL. Embodiments of different types can coexist in one combination. An easier way to combine vehicles together is to manually assembly them on the ground before takeoff. A sophisticated way is to automatically rendezvous and dock in flight.

A system for in-flight rendezvous and docking is shown in FIG. 6A to 6C. The system is similar to "probe and drogue" system used in aerial refueling. The main function of "probe and drogue" system is to transfer fuel in the flight. The system shown in FIG. 6A to 6C has 2 main functions:
1. To rendezvous and dock in flight
2. To transfer fuel or electricity Another difference is that in "probe and drogue" system fuel tank aircraft and fuel receiver aircraft align longitudinally; the system shown in FIG. 6 works in both longitudinal and lateral mode.

In lateral mode, as shown in FIG. 6A (it works in similar way when base tube 905 is on the left side of base tube 904), base tube 905 and 904 extends out from wing tip of front and rear aircraft respectively. Two aircraft first come to close formation under the guide of differential GPS sub-systems on 2 aircraft. When docking probe 900 is approximately behind drogue fingers 909, optoelectronic device 902 and 907 inside docking probe 900 and drogue arm 906 respectively, work together with the onboard differential GPS sub-systems to guide the in-flight rendezvous and docking process. Under the guidance, docking probe 900 moves forward into the funnel shaped space surrounded by drogue fingers 909, and it's will be captured by closing drogue fingers 909. Probe 900 can be rotated around axis 903, which is connected to base tube 904. Drogue arm 906 can be rotated around axis 908, which is connected to base tube 905. The rear aircraft, which is equipped with docking probe 900, then turns slight sideway while moving forward slowly. The system will reach configuration where component 900 to 908 are approximately lined up as shown in FIG. 6C. In the next step, drogue arm 906 pulls docking probe 900 in and completes the in-flight rendezvous and docking procedure.

In longitudinal mode, as shown in FIG. 6B, it works similarly, and the whole process is simpler. Base tube 904 still extends out from wing tip of rear aircraft. Base tube 905 extends out from rear end of front aircraft. After drogue fingers 909 capture docking probe 900, drogue arm 906 pulls docking probe 900 in and completes the in-flight rendezvous and docking procedure.

The combinability enables whole new set of opportunities. The following are some of possible applications enabled by the combinability:
1. Multiple embodiments are combined together to form a larger aircraft, which is capable of carry large payload that exceeds load capacity of individual embodiment.
2. In a formation of multiple embodiments, some of individual embodiments are dedicated to carry fuel acting as fuel tankers. Such fuel tankers may leave formation before reaching targets. Such formation has larger operation radius than that of single aircraft of similar type.
3. In-flight rendezvous and docking can be used to create buddy refueling system. Before an embodiment reaching target zone or after it leaves target zone, other embodiments can dock with it and refuel it. Thus operation radius of single embodiment is increased. Buddy refueling system also allows an embodiment to carry more payloads. An aircraft's maximum takeoff weight is generally less than the maximum weight with which it can stay airborne. Buddy refueling system allows an embodiment to take off with only a partial fuel load, and carry additional payload weight instead. Then, after reaching altitude, its tanks can be topped up by a tanker embodiment, bringing it up to its maximum flight weight.
4. A formation of multiple embodiments offers large redundancy, and therefore has greater chance to accomplish missions. Each embodiment in the formation is autonomous. When the formation is large, the chance of being completely destroyed in the first few attacks is small. When damage occur, the formation has the following options:
   a. When damage is small, carry on the damaged embodiments, and continue on the mission. In this case, the damaged embodiments, which would otherwise be lost, can be carried back to base and repaired. Thus in long run, operation cost will be smaller.
   b. When damage is large, disengage and discard the damaged embodiments, reconnect formation, and continue on the mission.

Also when threats coming, the formation might have chance to disengage, spread out to reduce damage, and re-dock later to form formation again.

What is claimed is:

1. A vertical and/or short takeoff and landing (V/STOL) enabled vehicle, comprising:
   a plurality of thrust generators which are powered by one or more power plants;
   means for said one or more power plants to drive said thrust generators directly or indirectly via transmission, and to change magnitudes of thrusts produced by said thrust generators;
   an airframe comprising a plurality of wings whose most portions are generally arranged on lateral or periphery of said thrust generators, wherein arrangements of said wings make it possible to optionally fold said wings without moving said thrust generators;
   means for mounting said thrust generators and said one or more power plants to said airframe in one of the following three configuration modes:
   VTOL mode wherein said thrust generators are configured in a way to generate thrusts generally pointing upward;

STOL mode wherein said thrust generators are configured in a way to generate thrusts with both upward components and forward components;

horizontal flight mode wherein said thrust generators are configured in a way to generate thrusts generally pointing forward;

whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;

thrust vectoring means for changing in flight from one of said three modes to any other one of said three modes whereby said vehicle becomes a V/STOL vehicle which is capable of in-flight transitions between any two of VTOL, STOL and horizontal flight mode;

avionics and flight control system, whereby said vehicle is capable of unmanned flight and/or manned flight with autopilot system;

means for attaching to and detaching from one or more similarly equipped vehicles in flight or before takeoff, whereby said vehicle is combinable so that multiple said vehicles can form a large composite V/STOL vehicle;

said wings comprise two swept backward wings joined at a head of the vehicle and located on a left and a right side with respect to a center rolling axis;

said power plants comprise two gas-powered or electric engines;

said thrust generators comprise two propellers driven by said engines;

said airframe comprises said wings, a front and a rear beam to mount said engines;

said front beam is mounted laterally to front parts of said two wings to support one of said engines;

said rear beam is mounted laterally to rear parts of said two wings to support another one of said engines;

said thrust vectoring means are located inside said wings, and are attached to ends of said front and rear beams to rotate said thrust generators to realize thrust vectoring.

2. A vertical and/or short takeoff and landing (V/STOL) enabled vehicle, comprising:

a plurality of thrust generators which are powered by one or more power plants;

means for said one or more power plants to drive said thrust generators directly or indirectly via transmission, and to change magnitudes of thrusts produced by said thrust generators;

an airframe comprising a plurality of wings whose most portions are generally arranged on lateral or periphery of said thrust generators, wherein arrangements of said wings make it possible to optionally fold said wings without moving said thrust generators;

means for mounting said thrust generators and said one or more power plants to said airframe in one of the following three configuration modes:

VTOL mode wherein said thrust generators are configured in a way to generate thrusts generally pointing upward;

STOL mode wherein said thrust generators are configured in a way to generate thrusts with both upward components and forward components;

horizontal flight mode wherein said thrust generators are configured in a way to generate thrusts generally pointing forward;

whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;

thrust vectoring means for changing in flight from one of said three modes to any other one of said three modes whereby said vehicle becomes a V/STOL vehicle which is capable of in-flight transitions between any two of VTOL, STOL and horizontal flight mode;

and optionally comprising:

avionics and flight control system, whereby said vehicle is capable of unmanned flight and/or manned flight with autopilot system;

and optionally comprising:

means for attaching to and detaching from one or more similarly equipped vehicles in flight or before takeoff, whereby said vehicle is combinable so that multiple said vehicles can form a large composite V/STOL vehicle;

said wings comprise two swept backward wings joined at a head of the vehicle and located on a left and a right side with respect to a center rolling axis;

said power plants comprise three or more gas-powered or electric engines;

said thrust generators comprise three or more propellers driven by said engines;

said airframe comprises said wings, a front and a rear beam to mount said engines;

said front beam is mounted laterally to front parts of said two wings to support one or more of said engines;

said rear beam is mounted laterally to rear parts of said two wings to support two or more of said engines;

said thrust vectoring means are located inside said wings, and are attached to ends of said front and rear beams to rotate said thrust generators to realize thrust vectoring.

3. The vehicle as set forth in claim 2 further comprising:

a left and a right vertical stabilizer generally vertically attached to tips of said two said wings respectively;

a horizontal stabilizer attached to tips of said wings and bottom ends of said vertical stabilizers.

4. The vehicle as set forth in claim 2 further comprising:

a left and a right vertical stabilizer generally vertically attached to tips of said two said wings respectively;

a horizontal stabilizer with two ends attached to said vertical stabilizers and being vertically higher than said wings.

5. A vertical and/or short takeoff and landing (V/STOL) enabled vehicle, comprising:

a plurality of thrust generators which are powered by one or more power plants;

means for said one or more power plants to drive said thrust generators directly or indirectly via transmission, and to change magnitudes of thrusts produced by said thrust generators;

an airframe comprising a plurality of wings whose most portions are generally arranged on lateral or periphery of said thrust generators, wherein arrangements of said wings make it possible to optionally fold said wings without moving said thrust generators;

means for mounting said thrust generators and said one or more power plants to said airframe in one of the following three configuration modes:

VTOL mode wherein said thrust generators are configured in a way to generate thrusts generally pointing upward;

STOL mode wherein said thrust generators are configured in a way to generate thrusts with both upward components and forward components;

horizontal flight mode wherein said thrust generators are configured in a way to generate thrusts generally pointing forward;

whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;

and optionally comprising:

thrust vectoring means for changing in flight from one of said three modes to any other one of said three modes whereby said vehicle becomes a V/STOL vehicle which is capable of in-flight transitions between any two of VTOL, STOL and horizontal flight mode;

and optionally comprising:

means for folding and unfolding said wings, whereby size of said vehicle becomes compact when said wings are folded;

and optionally comprising:

avionics and flight control system, whereby said vehicle is capable of unmanned flight and/or manned flight with autopilot system;

and optionally comprising:

means for attaching to and detaching from one or more similarly equipped vehicles in flight or before takeoff, whereby said vehicle is combinable so that multiple said vehicles can form a large composite V/STOL vehicle;

said thrust generators comprise three or more thrust generators driven by three or more engines;

components of said airframe are arranged on periphery of said thrust generators;

said airframe comprises a front beam, a rear beam, a left and a right side fuselage, a center fuselage, a left and a right swept backward minor wing, a left and a right swept backward major wing, a left and a right vertical stabilizer and a horizontal stabilizer;

said front beam is mounted laterally to front parts of said left and right side fuselage to support one or more of said engines;

said rear beam is mounted laterally to rear parts of said left and right side fuselages to support two or more of said engines;

said thrust vectoring means are optionally located inside said left and right side fuselage, and are optionally-attached to ends of said front and rear beams to rotate said thrust generators to realize thrust vectoring;

rear portions of roots of said two swept backward major wings are attached to front ends of said left and right side fuselages;

front portions of roots of said two major wings are attached to tips of said two swept backward minor wings;

roots of said two swept backward minor wings are connect to two sides of said center fuselage;

said left and right vertical stabilizers are generally vertically attached to tips of said left and right swept backward major wing respectively;

said horizontal stabilizer is horizontally attached to tips of said two swept backward major wings, bottom ends of said vertical stabilizers and rear ends of said left and right side fuselages;

said means for folding and unfolding two said major wings, said horizontal stabilizer and said vertical stabilizers are optionally located inside said left and right side fuselage;

said means for attaching and detaching similarly equipped vehicles are optionally located at head of said vehicle and at tips of said horizontal stabilizer.

6. A vertical and/or short takeoff and landing (V/STOL) enabled vehicle, comprising:

a plurality of thrust generators which are powered by one or more power plants;

means for said one or more power plants to drive said thrust generators directly or indirectly via transmission, and to change magnitudes of thrusts produced by said thrust generators;

an airframe comprising a plurality of wings whose most portions are generally arranged on lateral or periphery of said thrust generators, wherein arrangements of said wings make it possible to optionally fold said wings without moving said thrust generators;

means for mounting said thrust generators and said one or more power plants to said airframe in one of the following three configuration modes:

VTOL mode wherein said thrust generators are configured in a way to generate thrusts generally pointing upward;

STOL mode wherein said thrust generators are configured in a way to generate thrusts with both upward components and forward components;

horizontal flight mode wherein said thrust generators are configured in a way to generate thrusts generally pointing forward;

whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;

and optionally comprising:

thrust vectoring means for changing in flight from one of said three modes to any other one of said three modes whereby said vehicle becomes a V/STOL vehicle which is capable of in-flight transitions between any two of VTOL, STOL and horizontal flight mode;

and optionally comprising:

means for folding and unfolding said wings, whereby size of said vehicle becomes compact when said wings are folded;

and optionally comprising:
avionics and flight control system, whereby said vehicle is capable of unmanned flight and/or manned flight with autopilot system;
and optionally comprising:
means for attaching to and detaching from one or more similarly equipped vehicles in flight or before takeoff, whereby said vehicle is combinable so that multiple said vehicles can form a large composite V/STOL vehicle;
said thrust generators comprise three or more thrust generators;
components of said airframe are arranged on periphery of said thrust generators;
said airframe comprises a left and a right side fuselage, a center fuselage, a left and a right swept backward minor wing, a left and a right swept backward major wing, a left and a right vertical stabilizer and a horizontal stabilizer;
one or more of said thrust generators are mounted at a rear end of said center fuselage;
said horizontal stabilizer is mounted laterally to rear ends of said left and right side fuselages to support two or more of said thrust generators;
said thrust vectoring means are optionally located inside said fuselages to rotate said thrust generators to realize thrust vectoring;
rear portions of roots of said left and right swept backward major wings are attached to front ends of said left and right side fuselages respectively;
front portions of roots of said left and right swept backward major wings are attached to tips of said left and right swept backward minor wings respectively;
roots of two said minor wings are connect to two sides of front parts of said center fuselage;
said left and right vertical stabilizers are generally vertically attached to rear ends of said left and right side fuselage respectively;
said means for folding and unfolding said two swept backward major wings are optionally located inside said left and right side fuselage;
said means for attaching and detaching similarly equipped vehicles are optionally located at head of said vehicle and at tips of said major wings.

7. A vertical and/or short takeoff and landing (V/STOL) enabled vehicle, comprising:
 a plurality of thrust generators which are powered by one or more power plants;
 means for said one or more power plants to drive said thrust generators directly or indirectly via transmission, and to change magnitudes of thrusts produced by said thrust generators;
 an airframe comprising a plurality of wings whose most portions are generally arranged on lateral or periphery of said thrust generators, wherein arrangements of said wings make it possible to optionally fold said wings without moving said thrust generators;
 means for mounting said thrust generators and said one or more power plants to said airframe in one of the following three configuration modes:
  VTOL mode wherein said thrust generators are configured in a way to generate thrusts generally pointing upward;
  STOL mode wherein said thrust generators are configured in a way to generate thrusts with both upward components and forward components;
  horizontal flight mode wherein said thrust generators are configured in a way to generate thrusts generally pointing forward;
 whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;
 and optionally comprising:
 thrust vectoring means for changing in flight from one of said three modes to any other one of said three modes whereby said vehicle becomes a V/STOL vehicle which is capable of in-flight transitions between any two of VTOL, STOL and horizontal flight mode;
 and optionally comprising:
 means for folding and unfolding said wings, whereby size of said vehicle becomes compact when said wings are folded;
 and optionally comprising:
 avionics and flight control system, whereby said vehicle is capable of unmanned flight and/or manned flight with autopilot system;
 and optionally comprising:
 means for attaching to and detaching from one or more similarly equipped vehicles in flight or before takeoff, whereby said vehicle is combinable so that multiple said vehicles can form a large composite V/STOL vehicle;
said thrust generators comprise three or more thrust generators;
components of said airframe are arranged on periphery of said thrust generators;
said airframe comprises a front beam, a left and a right side fuselage, a center fuselage, a left and a right swept backward front minor wing, a left and a right swept backward major wing, a left and a right vertical stabilizer and a horizontal stabilizer;
one or more of said thrust generators are mounted at a rear end of said center fuselage;
said front beam is attached laterally to front ends of said left and right side fuselages to support said center fuselage and one or more said thrust generators;
said horizontal stabilizer is mounted laterally to rear ends of said left and right side fuselages to support two or more said thrust generators;
said thrust vectoring means are optionally located inside said fuselages to rotate said thrust generators to realize thrust vectoring;
a root of said left swept backward major wing is attached laterally to a left side of said left side fuselage;
a root of said right swept backward major wing is attached laterally to a right side of said right side fuselage;
a tip of said left swept backward minor wing is attached laterally to a right side of said left side fuselage;
a tip of said right swept backward minor wing is attached laterally to a left side of said right side fuselage;
roots of said two swept backward minor wings are connected to two sides of a front part of said center fuselage;
said left and right vertical stabilizers are generally vertically attached to tips of said left and right major wings;
said means for folding and unfolding two said major wings and said vertical stabilizers are optionally located inside said left and right side fuselage;

said means for attaching and detaching similarly equipped vehicles are located at head of said vehicle and at tips of said major wings.

8. A vertical and/or short takeoff and landing (V/STOL) enabled vehicle, comprising:
   a plurality of thrust generators which are powered by one or more power plants;
   means for said one or more power plants to drive said thrust generators directly or indirectly via transmission, and to change magnitudes of thrusts produced by said thrust generators;
   an airframe comprising a plurality of wings whose most portions are generally arranged on lateral or periphery of said thrust generators, wherein arrangements of said wings make it possible to optionally fold said wings without moving said thrust generators;
   means for mounting said thrust generators and said one or more power plants to said airframe in one of the following three configuration modes:
      VTOL mode wherein said thrust generators are configured in a way to generate thrusts generally pointing upward;
      STOL mode wherein said thrust generators are configured in a way to generate thrusts with both upward components and forward components;
      horizontal flight mode wherein said thrust generators are configured in a way to generate thrusts generally pointing forward;
   whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;
   and optionally comprising:
   thrust vectoring means for changing in flight from one of said three modes to any other one of said three modes whereby said vehicle becomes a V/STOL vehicle which is capable of in-flight transitions between any two of VTOL, STOL and horizontal flight mode;
   and optionally comprising:
   means for folding and unfolding said wings, whereby size of said vehicle becomes compact when said wings are folded;
   and optionally comprising:
   avionics and flight control system, whereby said vehicle is capable of unmanned flight and/or manned flight with autopilot system;
   and optionally comprising:
   means for attaching to and detaching from one or more similarly equipped vehicles in flight or before takeoff, whereby said vehicle is combinable so that multiple said vehicles can form a large composite V/STOL vehicle;
   said thrust generators comprise a front, a rear, a left and a right nozzles driven by jet air streams produced by one jet engine;
   components of said airframe are arranged on periphery of said thrust generators;
   said airframe comprises a left and a right side fuselage, a center fuselage, a left and a right swept backward minor wing, a left and a right swept backward major wing, a left and a right vertical stabilizer, a left and a right horizontal stabilizer;
   said jet engine is optionally located at front end of said center fuselage;
   said front nozzle is mounted at a front portion of said center fuselage, and said rear nozzle is mounted at a rear end of said center fuselage, wherein in VTOL mode jet air stream exit from said front nozzle pointing downward, and in horizontal flight mode jet air stream exit from said rear nozzle pointing rearward;
   said left and right nozzles are mounted laterally between rear ends of said left and right side fuselages and said left and right horizontal stabilizers, wherein jet air stream come from said rear end of said center fuselage through pipes connecting to said left and said right nozzles pointing downward in VTOL mode and rearward in horizontal flight mode;
   said thrust vectoring means are optionally located inside said fuselages to rotate said thrust generators to realize thrust vectoring;
   said center fuselage has a general cone shaped head at a location of a head of said vehicle with openings for air to enter said jet engine; said center fuselage has general cylinder shape at a middle and a cone shape nozzle at said rear end;
   a root of said left swept backward major wing is attached laterally to a left side of said left side fuselage;
   a root of said right swept backward major wing is attached laterally to a right side of said right side fuselage;
   a tip of said left swept backward minor wing is attached laterally to a right side of said left side fuselage;
   a tip of said right swept backward minor wing is attached laterally to a left side of said right side fuselage;
   roots of said two swept backward minor wings are connected to two sides of a front part of said center fuselage;
   said left and right vertical stabilizers are generally vertically attached to tips of said left and right major wings respectively;
   said left and right horizontal stabilizers are horizontally attached to rear ends of said center fuselage and to said left and right nozzles;
   said means for folding and unfolding two said major wings and said vertical stabilizers are optionally located inside said left and right side fuselage;
   said means for attaching and detaching similarly equipped vehicles are optionally located at head of said vehicle and at tips of said major wings.

9. A vertical and/or short takeoff and landing (V/STOL) enabled vehicle, comprising:
   a plurality of thrust generators which are powered by one or more power plants;
   means for said one or more power plants to drive said thrust generators directly or indirectly via transmission, and to change magnitudes of thrusts produced by said thrust generators;
   an airframe comprising a plurality of wings whose most portions are generally arranged on lateral or periphery of said thrust generators, wherein arrangements of said wings make it possible to optionally fold said wings without moving said thrust generators;
   means for mounting said thrust generators and said one or more power plants to said airframe in one of the following three configuration modes:
      VTOL mode wherein said thrust generators are configured in a way to generate thrusts generally pointing upward;
      STOL mode wherein said thrust generators are configured in a way to generate thrusts with both upward components and forward components;
      horizontal flight mode wherein said thrust generators are configured in a way to generate thrusts generally pointing forward;

whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;

and optionally comprising:

thrust vectoring means for changing in flight from one of said three modes to any other one of said three modes whereby said vehicle becomes a V/STOL vehicle which is capable of in-flight transitions between any two of VTOL, STOL and horizontal flight mode;

and optionally comprising:

means for folding and unfolding said wings, whereby size of said vehicle becomes compact when said wings are folded;

and optionally comprising:

avionics and flight control system, whereby said vehicle is capable of unmanned flight and/or manned flight with autopilot system;

and optionally comprising:

means for attaching to and detaching from one or more similarly equipped vehicles in flight or before takeoff, whereby said vehicle is combinable so that multiple said vehicles can form a large composite V/STOL vehicle;

said thrust generators comprise three or more thrust generators;

components of said airframe are arranged on periphery of said thrust generators;

said airframe comprises a front beam, a rear beam, a left and a right side fuselage, a left and a right front mini side fuselage, a center fuselage, a left and a right minor wing, a left and a right rear swept backward major wing, a left and a right front swept forward major wing, a left and a right vertical stabilizer and a horizontal stabilizer;

two or more said thrust generators are mounted on a left and a right side of said front beam, which passes through a front section of said center fuselage, and two ends of said front beam are attached laterally to front ends of said front left and right mini side fuselages;

one or more of said thrust generator are mounted at rear end of said center fuselage; said rear beam is mounted laterally to said left and right side fuselage to support said center fuselage and one or more said thrust generators;

said thrust vectoring means are optionally located inside said fuselages to rotate said thrust generators to realize thrust vectoring;

a root of said left minor wing is attached laterally to a left side of said center fuselage;

a root of said right minor wing is attached laterally to a right side of said center fuselage;

a tip of said left minor wing is attached laterally to right side of said left side fuselage;

a tip of said right minor wing is attached laterally to a left side of said right side fuselage;

a rear end of left mini side fuselage is attached to a front end of said left side fuselage;

a rear end of right mini side fuselage is attached to a front end of said right side fuselage;

said horizontal stabilizer is horizontally attached to rear ends of said left and right side fuselage;

a root of said left front swept forward major wing is attached laterally to a left side of a front end of said left side fuselage;

a root of said right front swept forward major wing is attached laterally to a right side of a front end of said right side fuselage;

a root of said left rear swept backward major wing is attached laterally to a left side of a rear end of said left side fuselage;

a root of said right rear swept backward major wing is attached laterally to a right side of rear end of said right side fuselage, and therefore said four major wings form a general X shape;

said left and right vertical stabilizer are generally vertically attached to tips of said rear left and right swept backward major wings respectively;

said means for folding and unfolding said major wings and said vertical stabilizers are optionally located inside said left and right side fuselage;

said means for attaching and detaching similarly equipped vehicles are optionally located at tips of said four major wings.

10. A vertical and/or short takeoff and landing (V/STOL) enabled vehicle, comprising:

a plurality of thrust generators which are powered by one or more power plants;

means for said one or more power plants to drive said thrust generators directly or indirectly via transmission, and to change magnitudes of thrusts produced by said thrust generators;

an airframe comprising a plurality of wings whose most portions are generally arranged on lateral or periphery of said thrust generators, wherein arrangements of said wings make it possible to optionally fold said wings without moving said thrust generators;

means for mounting said thrust generators and said one or more power plants to said airframe in one of the following three configuration modes:

VTOL mode wherein said thrust generators are configured in a way to generate thrusts generally pointing upward;

STOL mode wherein said thrust generators are configured in a way to generate thrusts with both upward components and forward components;

horizontal flight mode wherein said thrust generators are configured in a way to generate thrusts generally pointing forward;

whereby V/STOL enabled means that when said thrust generators are configured in VTOL mode to generate thrusts generally pointing upward, said vehicle is capable of takeoff and landing vertically and hovering; when said thrust generators are configured in STOL mode to generate thrusts with both upward component and forward component, said vehicle is capable of short takeoff and landing; when said thrust generators are configured in horizontal flight mode to generate thrusts generally pointing forward, said vehicle is capable of conventional horizontal takeoff and landing and conventional horizontal flight;

and optionally comprising:

thrust vectoring means for changing in flight from one of said three modes to any other one of said three modes whereby said vehicle becomes a V/STOL vehicle which is capable of in-flight transitions between any two of VTOL, STOL and horizontal flight mode;

and optionally comprising:

means for folding and unfolding said wings, whereby size of said vehicle becomes compact when said wings are folded;

and optionally comprising:
  avionics and flight control system, whereby said vehicle is capable of unmanned flight and/or manned flight with autopilot system;
and optionally comprising:
  means for attaching to and detaching from one or more similarly equipped vehicles in flight or before takeoff, whereby said vehicle is combinable so that multiple said vehicles can form a large composite V/STOL vehicle;
said thrust generators comprise three or more thrust generators;
components of said airframe are arranged on periphery of said thrust generators;
said airframe comprises a front beam of aerodynamically efficient airfoil shape, a left and a right side fuselage, a center fuselage, a left and right minor wing, a left and right rear major wing, a left and right front major wing, a horizontal stabilizer and a left and a right vertical stabilizer;
two or more of said thrust generators are mounted on said front beam, and two ends of said front beam are attached laterally to front ends of said left and right side fuselages;
one or more thrust generator are mounted at horizontal stabilizer which is mounted laterally to rear ends of said left and right side fuselage;
said thrust vectoring means are optionally located inside said fuselages to rotate said thrust generators to realize thrust vectoring;
a root of said left minor wing is attached to said center fuselage;
a tip of said left minor wing is attached to right side of said left side fuselage;
a root of said right minor wing is attached to said center fuselage;
a tip of said right minor wing is optionally attached to left side of said right side fuselage;
a root of said left front major wing is attached laterally to a left side of a front end of said left side fuselage;
a root of said right front major wing is attached laterally to a right side of a front end of said right side fuselage;
a root of said left rear major wing is attached laterally to a left side of rear end of said left side fuselage;
a root of said right rear major wing is attached laterally to a right side of a rear end of said right side fuselage;
said left and right vertical stabilizer are generally vertically attached to tips of said rear left and right swept backward major wing respectively;
said means for folding and unfolding said major wings and said vertical stabilizers are optionally located inside said left and right side fuselage;
said means for attaching and detaching similarly equipped vehicles are optionally located at tips of said major wings.

* * * * *